United States Patent
Coelho et al.

(12)

(10) Patent No.: US 6,213,334 B1
(45) Date of Patent: Apr. 10, 2001

(54) FLEXIBLE, THREE-DIMENSIONAL CONTAINERS AND METHODS FOR MAKING THEM

(75) Inventors: Philip H. Coelho, El Dorado Hills, CA (US); Ludwig Wolf, Jr., Inverness, IL (US); David P. Fisher; Allen R. Wons, both of Antioch, IL (US); William Bratten, Lake Villa, IL (US)

(73) Assignee: Baxter International INC, Deerfield, IL (US)

( * ) Notice: Subject to any disclaimer, the term of this patent is extended or adjusted under 35 U.S.C. 154(b) by 0 days.

(21) Appl. No.: 08/711,765

(22) Filed: Sep. 5, 1996
(Under 37 CFR 1.47)

(51) Int. Cl.[7] .................................................. A61B 19/00

(52) U.S. Cl. ........................ 220/501; 220/500; 206/461; 604/403; 53/396; 222/416

(58) Field of Search ............................ 206/461; 604/403, 604/408; 220/500, 501; 53/396; 222/416

(56) References Cited

U.S. PATENT DOCUMENTS

| Re. 31,135 | 2/1983 | Winchell et al. . |
| 699,778 | 5/1902 | Uphan . |
| 1,374,088 | 5/1921 | Miller . |
| 3,576,650 | 4/1971 | Underwood et al. . |
| 3,616,033 | 10/1971 | Blentarp . |
| 3,654,012 | 4/1972 | Schlager . |
| 3,727,788 | * 4/1973 | Holbrook .............................. 604/403 |
| 3,755,040 | 8/1973 | Robinson . |
| 3,801,402 | 4/1974 | Suter . |
| 3,861,977 | 1/1975 | Wiley . |
| 4,076,063 | 2/1978 | Cammarata et al. . |
| 4,105,730 | 8/1978 | Cammarata et al. . |
| 4,116,338 | 9/1978 | Weichselbaum . |
| 4,191,213 | 3/1980 | Winchell et al. . |
| 4,244,364 | 1/1981 | Grushkin . |
| 4,253,458 | 3/1981 | Bacehowski et al. . |
| 4,453,940 | 6/1984 | Aoyagi et al. . |
| 4,460,362 | 7/1984 | Ganshirt et al. . |

(List continued on next page.)

FOREIGN PATENT DOCUMENTS

| 455916 | 4/1949 | (CA) . |
| 2343453 | 7/1975 | (DE) . |
| 3197031 | 12/1989 | (JP) . |
| 3197031 | of 1991 | (JP) . |
| 627990 | 8/1978 | (RU) . |

OTHER PUBLICATIONS

Description of a Closed Plastic Bag System for the Collection and Cryopreservation of Leukapheresis–Derived Blood Mono–nuclear Leukocytes and CFUc from Human Donors by M. Korbling, T.M. Fliedner, E. Ruber and H. Pflieger.

Pablo Rubinstein, MD, et al., Placental & Umbilical Cord Blood Banking for Unrelated Marrow Reconstitution, 1995, American Association of Blood Banks.

Two Firms Tackle Cord–Blood Transplants, *Bio/Technology*, vol. 12, Jan., 1994, pp. 23, 24.

*Primary Examiner*—Joseph M. Moy
(74) *Attorney, Agent, or Firm*—Gary W. McFarron; Daniel D. Ryan; Denise M. Serewicz

(57) ABSTRACT

A flexible, three-dimensional container is made by a prescribed vacuum-molding and heat sealing process. The container possesses a precise, defined geometry before and during use. The container is formed from first and second walls. The first wall has a planar area and a vacuum-molded cavity area drawn out of the plane of the planar area into a predefined three-dimensional geometry. A second wall overlies the first wall to close the cavity area and thereby forms an interior compartment. A thermal seal joins the two walls together. The seal is formed by heating the second wall and the first wall in the planar area, while assuring that the cavity area of the first wall is not subject to heating and possible deformation of its precise vacuum-molded geometry.

16 Claims, 17 Drawing Sheets

U.S. PATENT DOCUMENTS

| | | |
|---|---|---|
| 4,505,708 | 3/1985 | Gajewski et al. . |
| 4,550,825 | 11/1985 | Sutryn . |
| 4,588,401 | 5/1986 | Kilkson . |
| 4,588,554 | 5/1986 | Kaartinen . |
| 4,613,640 | 9/1986 | Deisler et al. . |
| 4,630,448 | 12/1986 | Bilstad et al. . |
| 4,645,482 | 2/1987 | Yoshida . |
| 4,657,542 | 4/1987 | Ohachi . |
| 4,670,013 * | 6/1987 | Barnes et al. ............... 604/403 |
| 4,820,297 | 4/1989 | Kaufman et al. . |
| 4,854,737 | 8/1989 | Steer et al. . |
| 4,910,147 | 3/1990 | Bacehowski et al. . |
| 4,915,847 | 4/1990 | Dillon et al. . |
| 4,994,021 | 2/1991 | Smith et al. . |
| 4,997,083 | 3/1991 | Loretti et al. . |
| 5,004,681 | 4/1991 | Boyse et al. . |
| 5,018,622 * | 5/1991 | Hartley ............... 206/461 |
| 5,038,938 * | 8/1991 | Berndt ............... 604/403 |
| 5,045,076 * | 9/1991 | Pierce ............... 604/403 |
| 5,055,198 | 10/1991 | Shettigar . |
| 5,066,290 | 11/1991 | Measells et al. . |
| 5,114,421 * | 5/1992 | Polak ............... 604/403 |
| 5,135,762 | 8/1992 | Vernon et al. . |
| 5,163,554 | 11/1992 | Lampropoulos et al. . |
| 5,171,234 | 12/1992 | Jepson et al. . |
| 5,176,258 * | 1/1993 | Antal ............... 206/461 |
| 5,188,620 | 2/1993 | Jepson et al. . |
| 5,192,553 | 3/1993 | Boyse et al. . |
| 5,226,564 | 7/1993 | Steer et al. . |
| 5,257,983 * | 11/1993 | Garyantgs et al. ............... 604/403 |
| 5,300,059 | 4/1994 | Rubinstein et al. . |
| 5,306,269 | 4/1994 | Lewis et al. . |
| 5,348,549 * | 9/1994 | Brown et al. ............... 604/403 |
| 5,356,373 | 10/1994 | Dracker . |
| 5,375,701 * | 12/1994 | Hustad et al. ............... 206/461 |
| 5,379,895 * | 1/1995 | Foslien ............... 206/461 |
| 5,411,499 | 5/1995 | Dudar et al. . |
| 5,423,794 * | 6/1995 | Adolf et al. ............... 604/403 |
| 5,439,100 * | 8/1995 | Gordon et al. ............... 206/461 |
| 5,460,625 | 10/1995 | Johnson . |
| 5,474,169 * | 12/1995 | Bauman ............... 206/461 |
| 5,485,919 * | 1/1996 | Samberg et al. ............... 206/461 |
| 5,486,390 * | 1/1996 | Burns et al. ............... 206/461 |
| 5,954,958 * | 9/1999 | Folden ............... 604/403 |

* cited by examiner

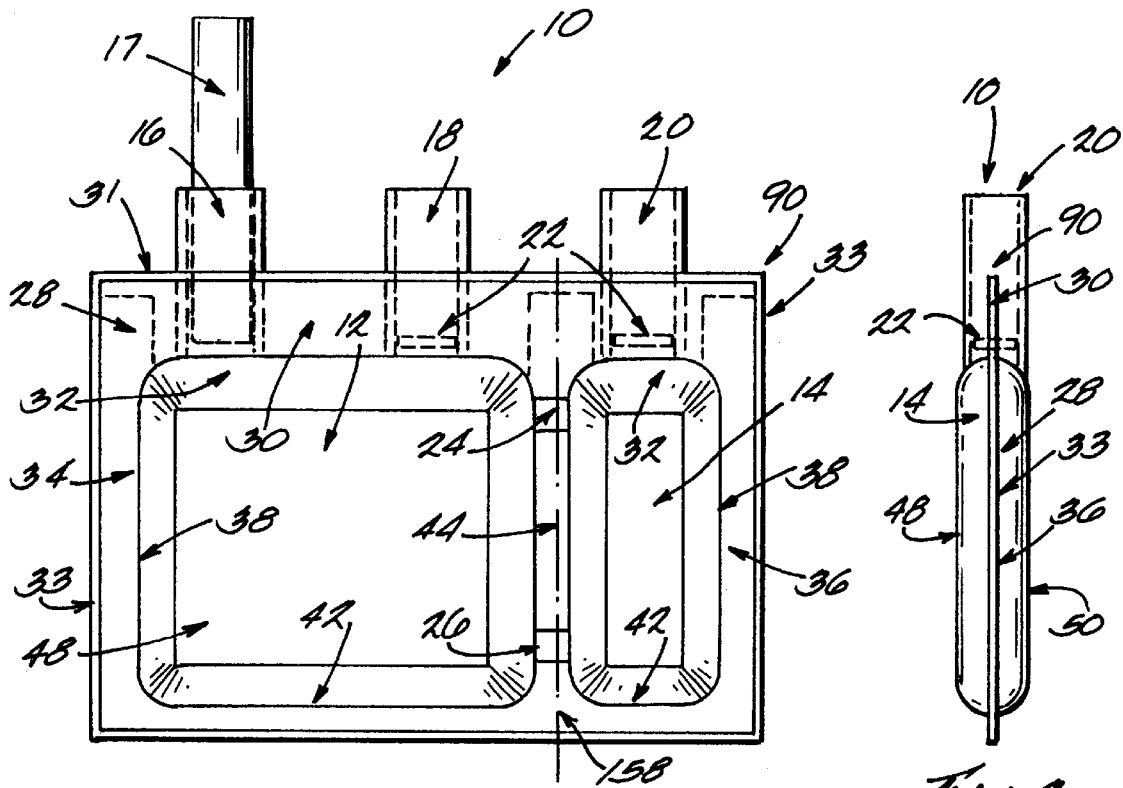
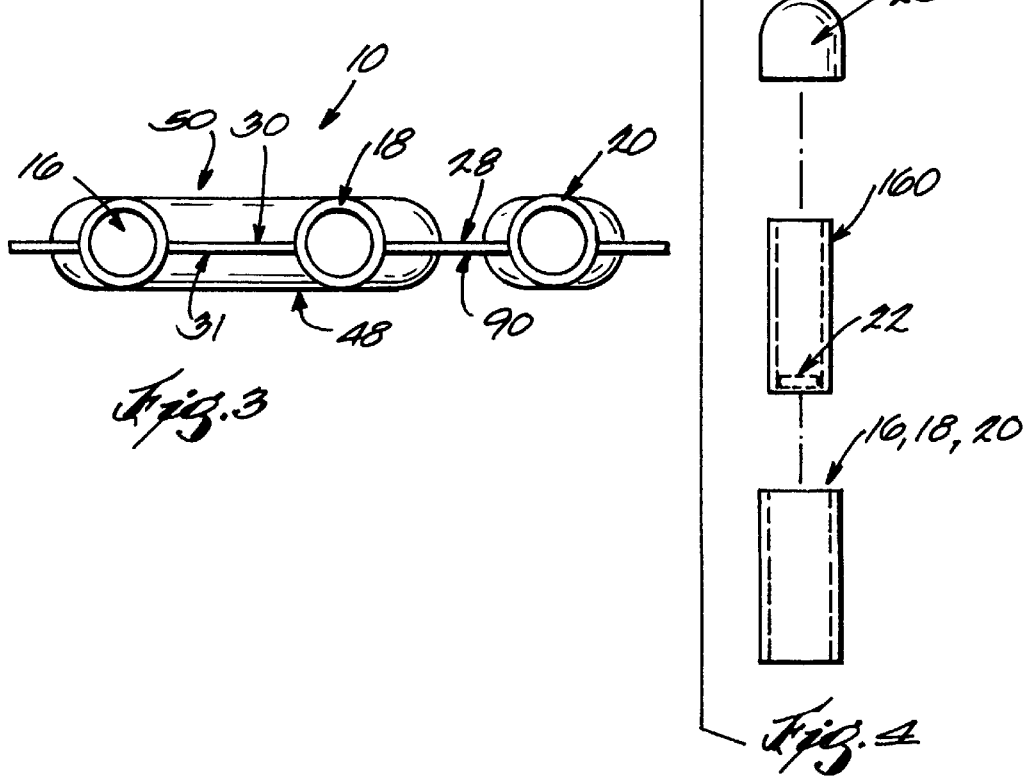

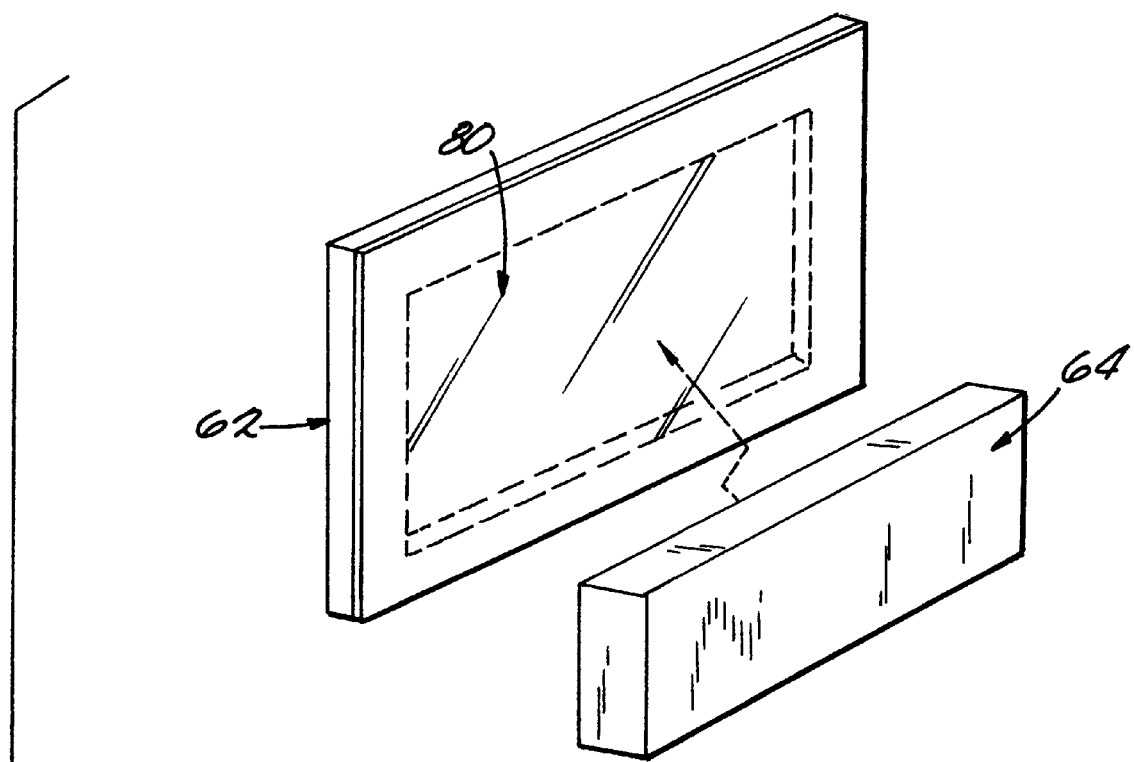
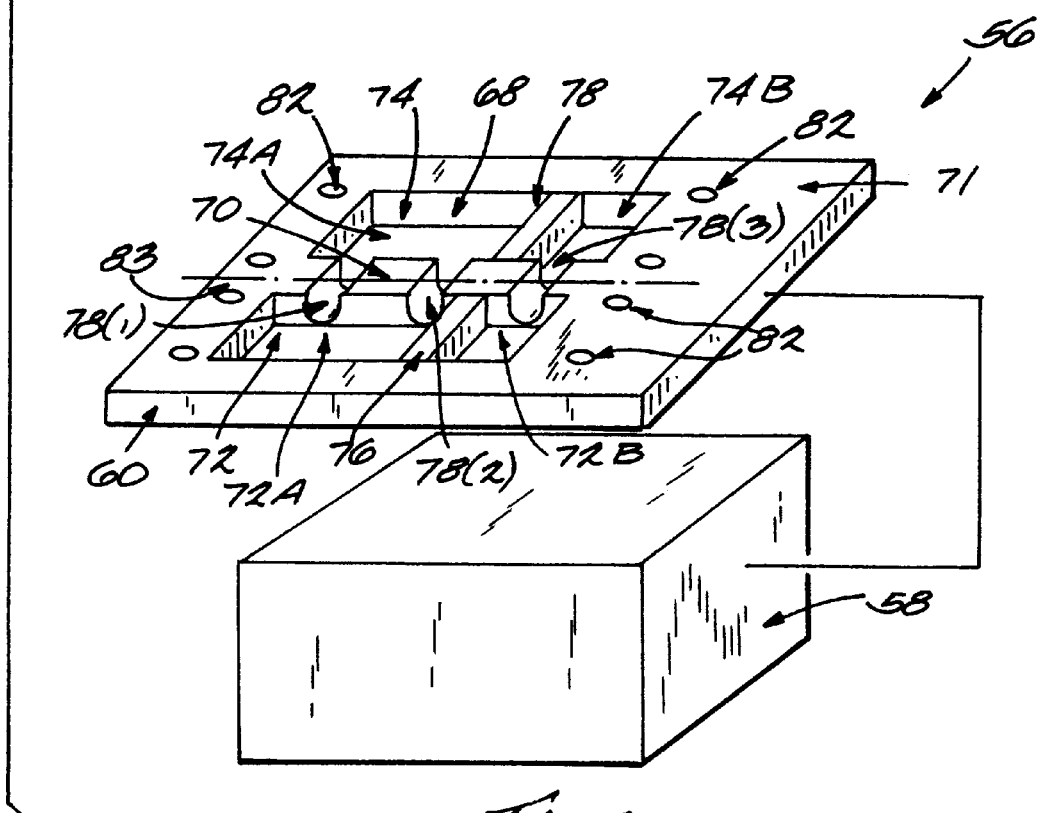
Fig. 6

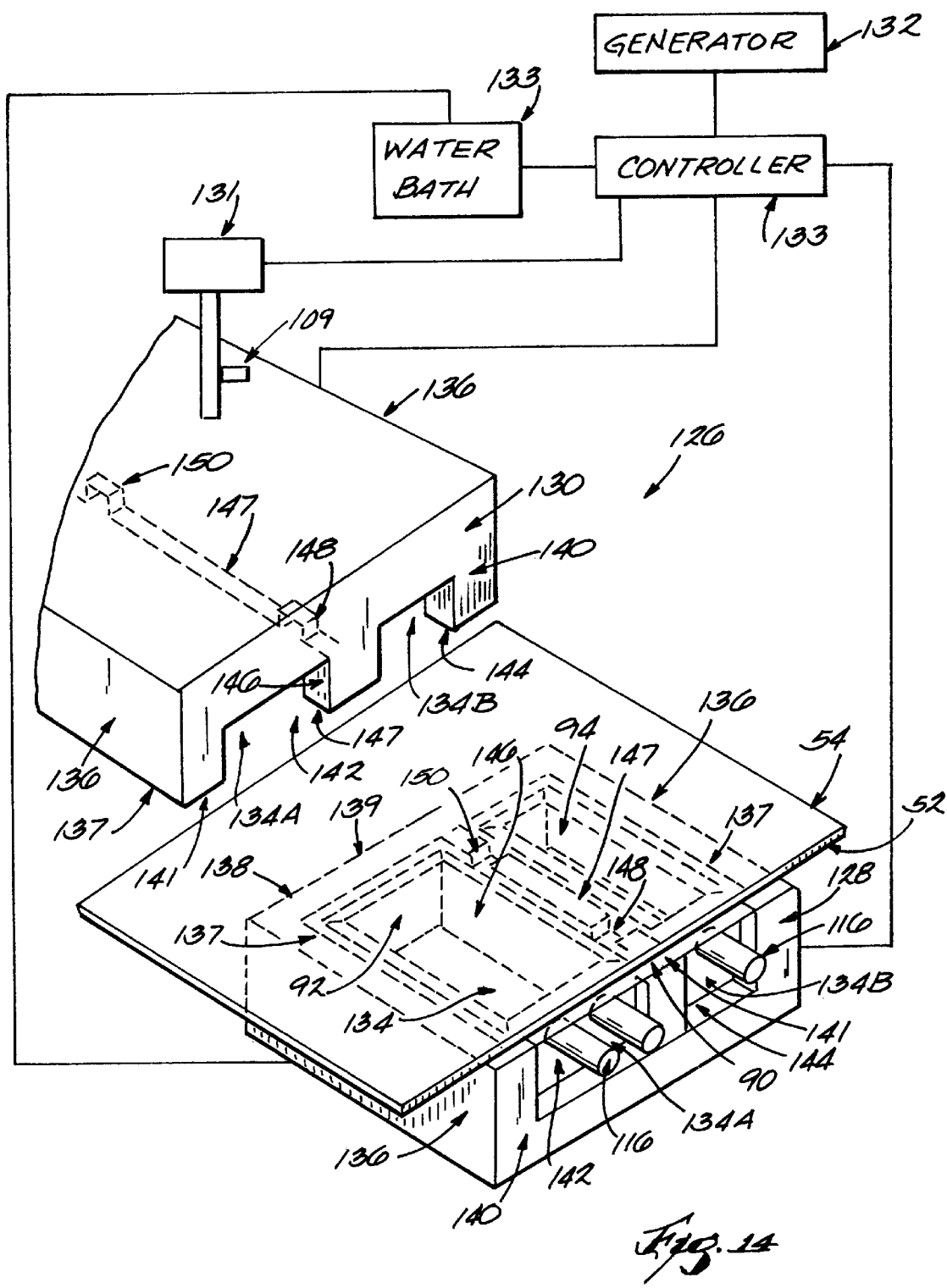

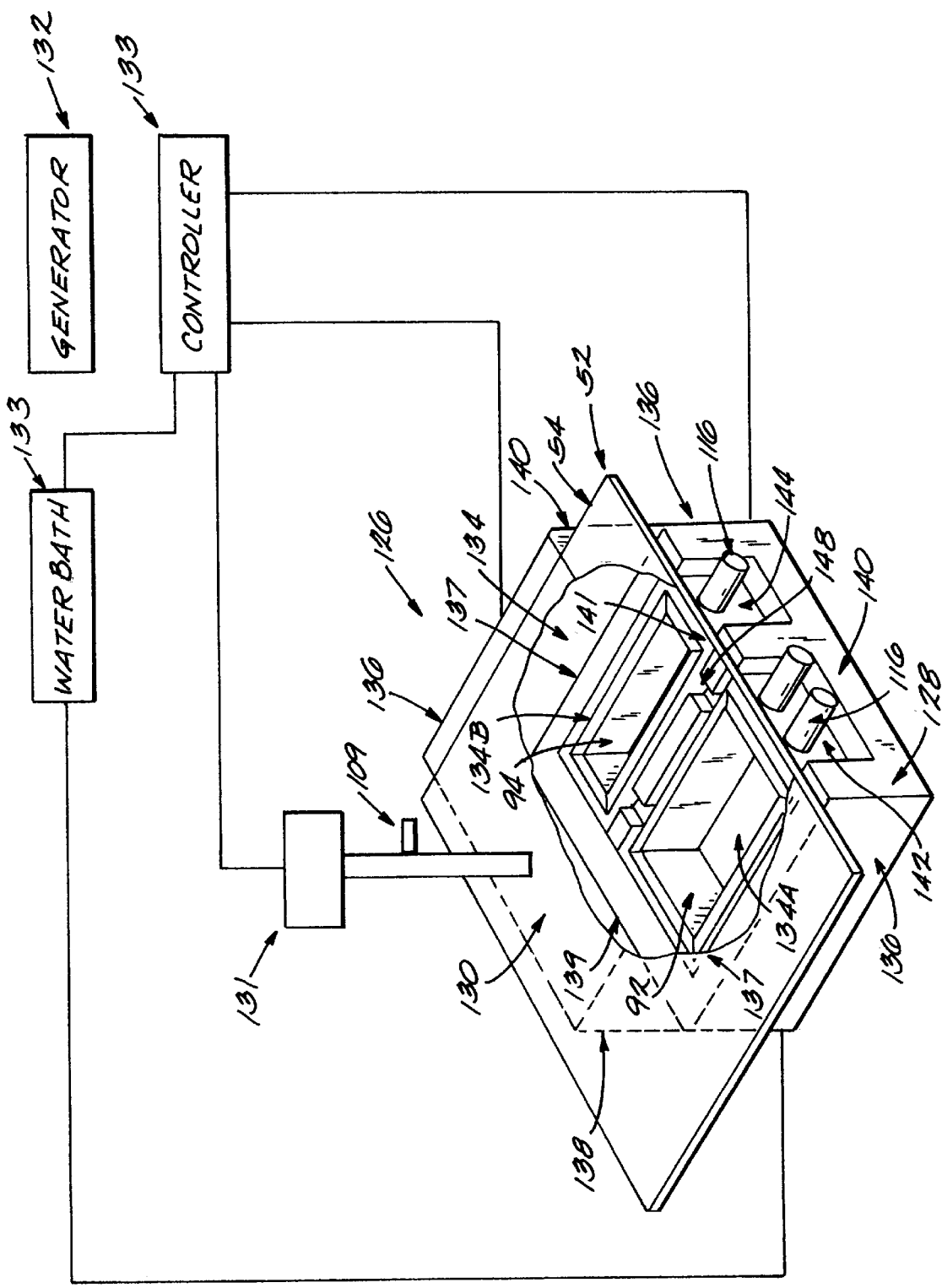

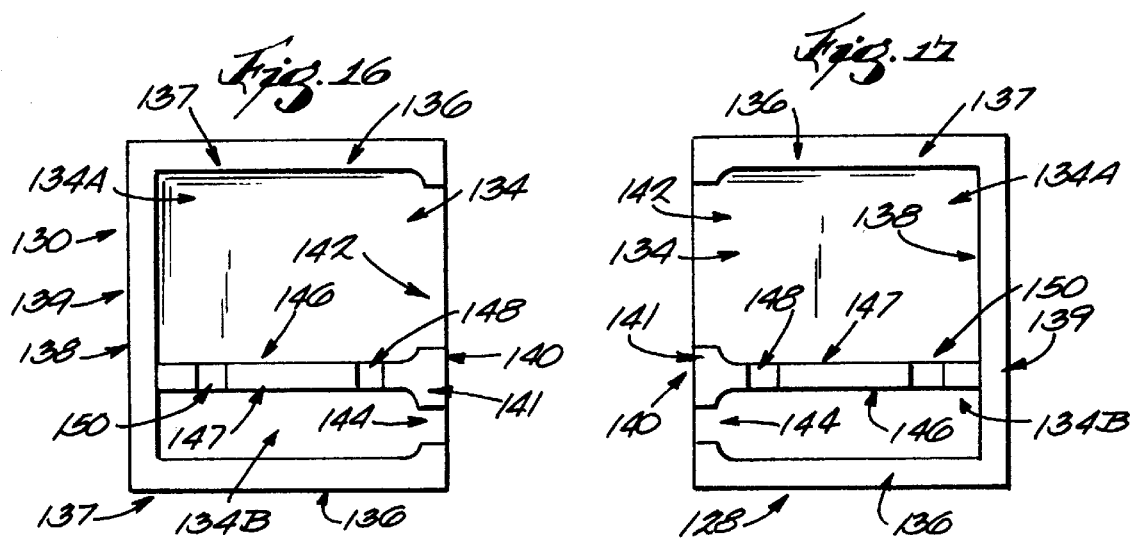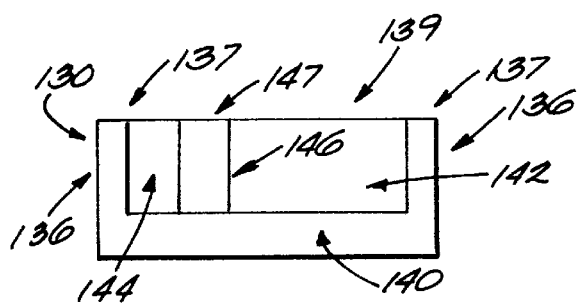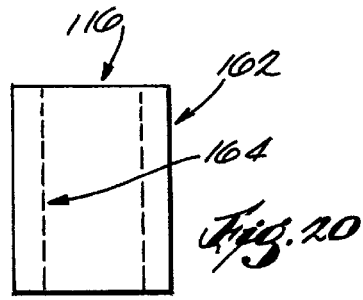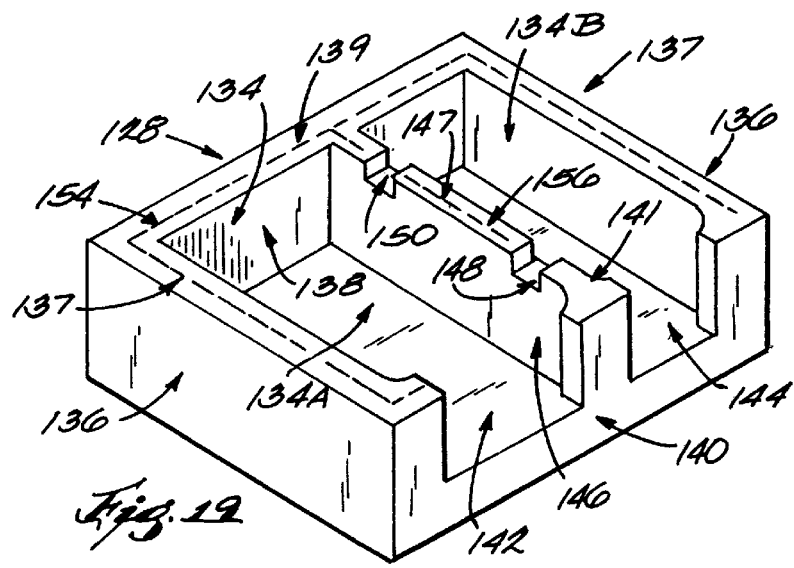

FLEXIBLE, THREE-DIMENSIONAL CONTAINERS AND METHODS FOR MAKING THEM

FIELD OF THE INVENTION

The invention relates to flexible containers and to processes by which these containers are made. In a more particular sense, the invention relates to flexible containers and associated manufacturing processes having attributes well suited for use in the medical field.

BACKGROUND OF THE INVENTION

Flexible containers for use in the medical field to process or store blood and tissue are well known. These containers are typically "lay flat" bags, formed by heat sealing flat sheets of medical grade plastic material together, with access ports, about their peripheral edges. These bags are ideally suited for many uses in the medical field.

Still, the opposite sheets of flexible plastic that make up the walls of these bag are subject to non-uniform deformation during use. That is, the sheeting deforms non-uniformly depending upon the orientation of the bags and the location of materials within the bags, so that one area of the bag will have a different geometry than another. For example, the bottom of the bag, in which the materials naturally accumulate by gravity, will be wider than the top of the bag, which is normally free of materials. This disparity in the distribution of stress can lead to localized failures and leaks. Because of the non-uniform deformation, these bags are also not well suited for measuring precise fluid volumes.

One objective of the invention is to provide a container having a three-dimensional geometry, when empty, that does not significantly change after materials are added to the container.

Another objective of the invention is to provide a container that combines a uniform three-dimensional geometry with flexibility.

Yet another objective of the invention is to provide a flexible, three-dimensional container that is assembled in a way that imparts durability and strength to resist failure or fatigue when used as intended.

Still another objective of the invention is provide a flexible, three-dimensional container that can be use for precise fluid volume measurement.

SUMMARY OF THE INVENTION

The invention provides flexible, three-dimensional containers, which possess precise, defined geometries before use that are maintained during use. The invention also provides vacuum-molding and heat sealing processes, by which flexible, three-dimensional containers can be made that meet exacting size and volume requirements. The prescribed vacuum-molding and heat sealing processes create robust three-dimensional containers that are more resistant to stress-related material fatigue and failure than conventional flexible "lay-flat" bags.

Containers that embody features of the invention are formed from first and second walls. The first wall has a planar area and a vacuum-molded cavity area drawn out in a predefined three-dimensional geometry. A second wall overlies the first wall to close the cavity area and thereby form an interior compartment. A thermal seal joins the two walls together. The seal is formed by heating the second wall and the first wall in the planar area. The heat sealing processes that embody features of the invention assure that the desired heat sealing effects are localized away from the cavity area of the first wall. Thus, as heat sealing occurs, the cavity area of the first wall is not subject to heating and possible deformation of its precise vacuum-molded geometry.

In a preferred embodiment, both first and second walls possess a vacuum-molded cavity area. The cavity area of the first wall is a mirror image of the cavity area of the second wall. The cavity areas coincide when the first and second wall overlie each other.

In a preferred embodiment, the container includes at least two vacuum-molded cavities, thereby forming multiple interior compartments, each having a precise, three-dimensional geometry. In this embodiment, an interior seal is located between the interior compartments. The interior seal is purposely interrupted at one or more desired locations to form one or more interior passages, which offer fluid flow communication between the two interior compartments.

Other features and advantages of the inventions are set forth in the following Description and Drawings, as well as in the appended claims.

BRIEF DESCRIPTION OF THE DRAWINGS

FIG. 1 is a front view of a flexible three-dimensional container, which embodies features of the invention;

FIG. 2 is a right side elevation view of the container shown in FIG. 1;

FIG. 3 is a top view of the container shown in FIG. 1;

FIG. 4 is an exploded side view of a port tube assembly, which the container shown in FIG. 1 incorporates;

FIG. 6 is a perspective view of an assembly for vacuum molding the shells shown in FIG. 5 from a single sheet of flexible material;

FIG. 14 is a perspective view of a finishing assembly used to form, by heat sealing, additional peripheral and interior seals, which is part of the process of making the container shown in FIG. 1 from the subassembly shown in FIG. 13;

FIG. 15 is a perspective view of the finishing assembly shown in FIG. 14 in use to form additional peripheral and interior seals to form the container shown in FIG. 1;

FIGS. 16 and 17 are top views of the mating, mirror image fixtures that comprise the finishing assembly shown in FIG. 14;

FIG. 18 is a front view of the fixture shown in FIG. 16;

FIG. 19 is a top perspective view of the fixture shown in FIG. 17;

FIG. 20 is a side view of a port tube, which has been coextruded from two materials, and which can be used in the process of making the container shown in FIG. 1;

Figure 5:
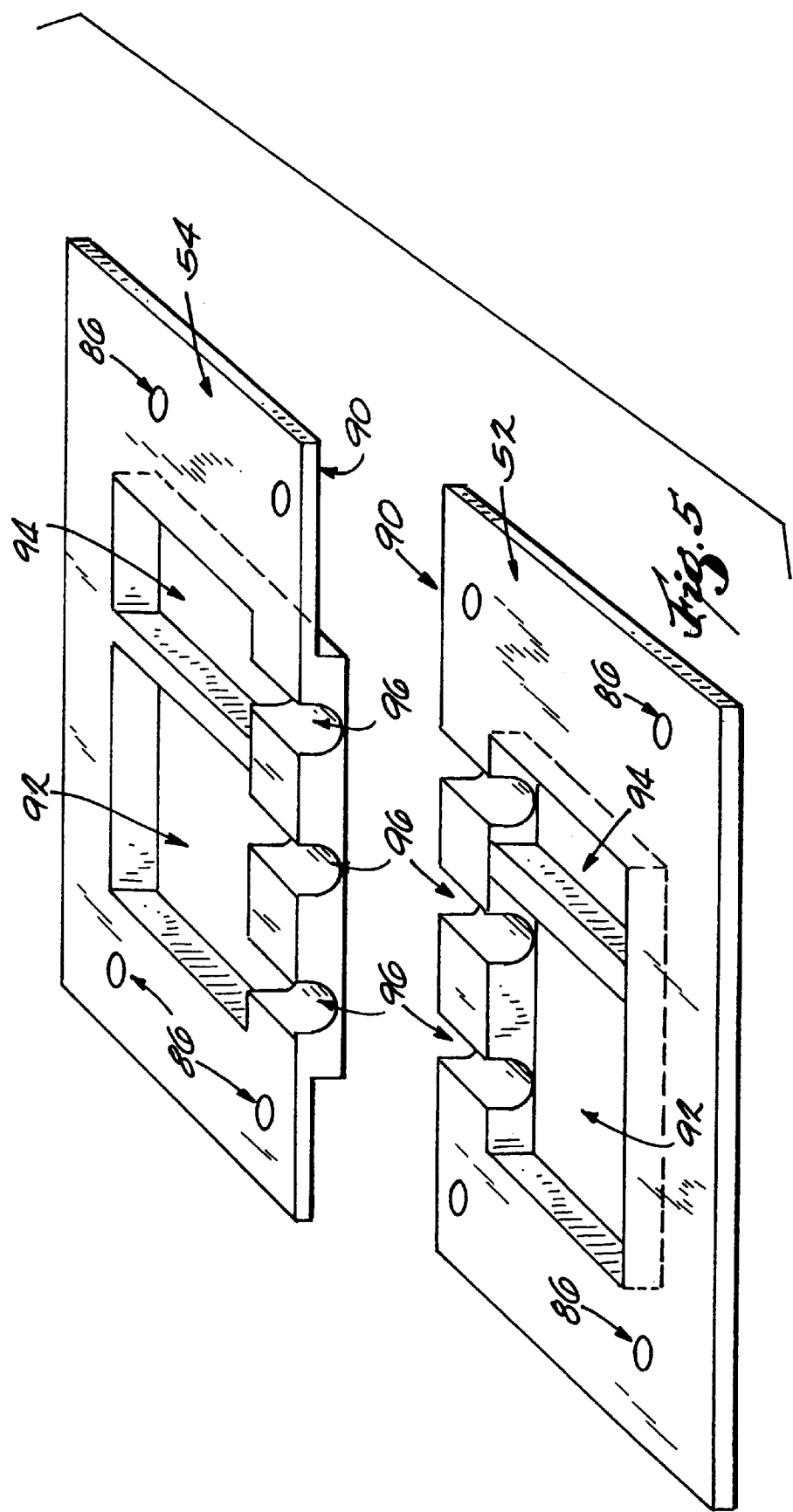
FIG. 5 is a perspective view of the vacuum molded shells from which the container shown in FIG. 1 is made.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DESCRIPTION OF THE PREFERRED EMBODIMENTS

FIGS. 1 to 3 show a preferred embodiment of a flexible, three dimensional container 10, which embodies features of the invention. In this embodiment, the container 10 takes the form of a composite multiple chamber bag. The bag 10 is capable for use in many diverse environments. The bag is particularly well suited for use in the medical field to process or store blood constituents or tissue. For this reason, the bag 10 will be described in the context of this end use.

A. Composite Bag Structure

In particular, the bag 10 shown in FIGS. 1 to 3 is intended to receive a relatively small volume of blood constituent for storage at cryogenic temperatures. A representative embodiment of a bag intended for this use measures about 3.5 inches in width, about 3.0 inches in height, and about 0.25 to 0.50 inch in thickness.

Because of the contemplated end use, the bag 10 is made from materials having low glass transition temperatures, so that the bag can withstand cryogenic temperatures. Examples of such materials include polyethylene, polypropylene, ethylene-vinyl-acetate, fluropolymers, or copolymers of these materials. Of course, other materials can be used when other end uses are contemplated, which do not involve exposure to cryogenic temperatures.

As illustrated in FIGS. 1 to 3, the bag 10 includes two interior compartments 12 and 14. As FIG. 1 shows, the compartments 12 and 14 are of different sizes. Of course, the bag 10 can include a single compartment, or other multiple compartments having different geometries.

Multiple ports 16, 18, and 20 individually service the compartments 12 and 14. Two ports 16 and 18 communicate with the first compartment 12. One port 20 communicates with the second compartment 14. Of course, more or fewer ports can be provided, according to the requirements dictated by the intended use.

In the illustrated and preferred embodiment, the port 16 is coupled to a length of flexible tubing 17. The tubing 17 carries at its free end a suitable sterile or aseptic connection device (not shown), to establish communication with a source of material that is to be conveyed into the bag compartment 12. Once the material is transferred into the compartment 12, the tubing 17 can be closed by a conventional frangible seal, which permits tubing 17 beyond the seal to be disconnected from the bag 10.

In the illustrated and preferred embodiment, the ports 18 and 20 each carry within them a pierceable membrane 22. The membranes 22 normally close the ports 18 and 20 to fluid flow. In use, the membranes 22 are opened by conventional pointed cannulas, or "spikes", which are well known in the medical field. The pointed cannulas are typically carried by flexible tubing to channel material into or out of the bag compartments 12 or 14. As FIG. 4 shows, a removable cap 25 preferably closes the end of the ports 18 or 20 before use.

The composite bag 10 also includes interior fluid passages 24 and 26. The passages 24 and 26 permit fluid (gas and liquid) flow between the interior compartments 24 and 26 during use. For example, a sample of the material can be conveyed from the compartment 12 into the compartment 14 through the interior passages 24 and 26. The passages 24 and 26 can be sealed during use using a conventional hand-held sealer, for example, the SEBRA™ sealer Model 1090, made and sold by Engineering Research Associates (Tucson, Ariz.).

As FIG. 1 shows, the bag includes an upper interior passage 24 and a lower interior passage 26. The bag 10 may include more or fewer or no interior passages.

The composite bag 10 includes a continuous peripheral seal 28. The continuous peripheral seal 28 includes an upper region 30, which seals the ports 16, 18, and 20 to the bag 10. The upper seal region 30 also seals the top exterior edges 32 of the two compartments 12 and 14.

The peripheral seal 28 also includes a left seal region 34 and a right seal region 36. The left and right seal regions 34 and 36 seal, respectively, the exterior side edges 38 of the first and second compartments 12 and 14.

The peripheral seal 28 further includes a bottom seal region 40. The bottom seal region 40 seals the bottom exterior edges 42 of the two compartments. An interior seal region 44 seals the interior side edges 46 of the first and second compartments 12 and 14. Spaced apart interruptions in the interior seal 44 form the upper and lower interior passages 24 and 26, already described.

The peripheral seal 28 creates a leakproof barrier for the ports and exterior edges 32, 38, and 42 of the compartments 12 and 14. The interior seal 44 likewise creates a leakproof barrier for the interior edges 46 of the compartments 12 and 14, except where purposely interrupted to form the upper and lower interior passages 24 and 26.

As FIGS. 2 and 3 best show, the front wall 48 and the back wall 50 of the bag 10 extend, when the bag 10 is empty, outwardly beyond the plane peripheral seal 28, forming a generally convex or bowed, dome shape. The preformed walls 48 and 50, joined together by the peripheral and interior seals 28 and 44, provide a three-dimensional, yet flexible geometry.

B. The Wall Shells

The outwardly bowed front and back walls 48 and 50 of the composite bag 10 comprise separate, preformed first and second shells 52 and 54. FIG. 5 shows the shells 52 and 54 after preforming, but before assembly into the composite bag 10. Assembly of the bag 10 entails joining the shells 52 and 54 together along the peripheral and interior seals 28 and 44, which FIGS. 1 to 3 show.

According to one aspect of the invention, the convex shells 52 and 54 are preformed from flexible flat sheet material by vacuum molding. FIGS. 6 to 9 show the details of a preferred vacuum molding process for the shells 52 and 54.

Figure 7:
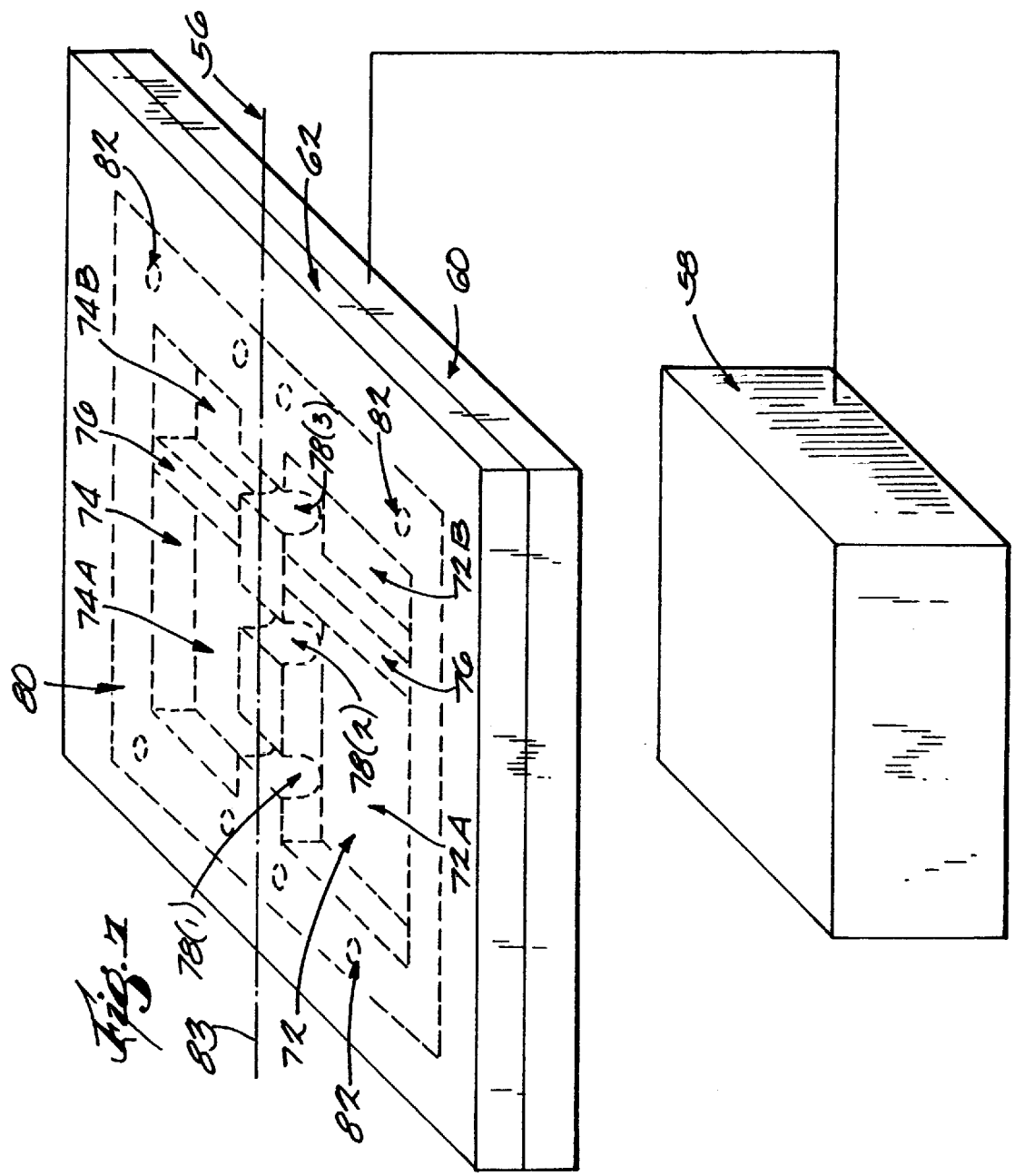
FIG. 7 is a perspective view of the assembly shown in FIG. 6 in an operating condition, during which an integrated dual shell unit is formed from the single sheet of flexible material.

As FIGS. 6 and 7 show, the process makes use of a vacuum mold assembly 56 which communicates with a vacuum pump 58. The mold assembly 56 includes a forming fixture 60 and a frame 62 to hold a sheet 80 of flexible material. The mold assembly 56 also includes a heater 64.

The forming fixture 60 has a preformed interior cavity 68. The geometry of the cavity 68 is imparted to the first and second shells 52 and 54 during the vacuum molding process.

In the illustrated and preferred embodiment, the cavity 68 is divided by a first elevated partition 70 into two sections 72 and 74. The elevated surface of the partition 70 is machined to be coplanar with the periphery of the fixture 60.

Each cavity section 72 and 74 is further subdivided by a second partition 76 into two subregions 72A and 72B/74A and 74B. The elevated surface of the second partition 76 is also machined to be coplanar with the periphery of the fixture 60.

As FIG. 6 shows, the second partitions 76 extend in their respective cavity sections 72 and 74 in a diametrically aligned relationship. The subregion 72A therefore symmetrically mirrors subregion 74A, just as subregion 72B symmetrically mirrors subregion 74B.

The first partition 70 further includes spaced apart grooves 78(1); 78(2); and 78(3) between the two cavity sections 72 and 74. Two grooves 78(1) and 78(2) link the subregions 72A and 74A together. A single groove 78(3) links the subregions 72B and 74B together.

Alternatively, the fixture 60 can include raised surface features, which provide a convex, reverse image of the concave geometry of the cavity 68.

The symmetry of the subdivided regions 72A/74A and 72B/74B makes it possible to simultaneously form the first and second shells 52 and 54 from a single sheet 80 of flexible material in a single vacuum molding step.

As FIG. 6 shows, the sheet 80, carried by the frame 62, is heated by the heater 64. The frame 62 is then lowered onto the forming fixture 60 (see FIG. 7). The frame 62 locates the heated sheet 80 over the cavity 68, while the pump 58 creates a vacuum in the fixture cavity 68. The vacuum draws the heated sheet 80 into the cavity subregions 72A, 72B, 74A, and 74B and the grooves 78(1) to 78(3). The elevated partitions 70 and 76 hold the remaining sheet material in a coplanar relationship. In the alternative embodiment using the raised, reverse image, the vacuum draws the sheet 80 over the raised surface features, instead of into the cavity 68.

Preset locator pins 82 on the fixture 60 punch through the sheet 80 during the molding process. In the illustrated and preferred embodiment, the locator pins 82 are arranged in a prescribed specific pattern symmetrically about a centerline position 83 on the fixture 60. The resulting pattern of holes 86 is left in the sheet 80 during vacuum molding (see FIG. 8). The formed holes 86 are useful to position and orient the shells 52 and 54 in later processing steps, as will be described in greater detail later.

After a prescribed time period, the frame 62 is lifted from the fixture 60, and the sheet 80 is removed from the frame 62. The vacuum has formed the two shells 52 and 54 (see FIG. 8), having symmetric geometries which conform to the symmetric geometries machined into the fixture 60.

The above described process can be carried out by a commercial vacuum molding company, such as, for example, Plastofilm Industries, Inc. (Wheaton, Ill.).

The formed shells 52 and 54 lay symmetrically about a centerline 88. The interior geometry of the subregions 72A and 74A of the fixture 60 forms the shell regions 92, which symmetrically split the interior volume of the first compartment 12 between the first and second shells 52 and 54. The interior geometry of the subregions 72B and 74B of the fixture 60 forms regions 94, which symmetrically split the interior volume of the second compartment 14 between the two shells 52 and 54. The grooves 78(1) to 78(3) of the fixture 60 form regions 96, which symmetrically split the port paths between the two shells 52 and 54.

Precise machining of the cavity 68 of the forming fixture 60 makes possible the creation of precise geometries for these regions 92, 94, and 96 of the shells 52 and 54 and thus the corresponding compartments 12 and 14 and ports 16, 18, and 20 of the composite bag 10 itself.

Altering the depth of the cavity 68, in whole or in part correspondingly alters the thickness of the composite bag 10, in whole or in part. In the illustrated embodiment, the depth of each cavity region 72 and 74 is shown to be equal, thereby each constituting one-half the total thickness of the composite bag 10. The formed shells 52 and 54 are thereby symmetric, when viewed from the side. However, the cavity regions 72 and 74 need not be formed with equal depths, thereby creating side-view asymmetric structures.

Likewise, altering the relative location and width of the second partition 76 in the cavity 68 alters the relative location and widths of the compartments 12 and 14. The cavity depth can also be adjusted to make one compartment 12 or 14 possess a greater depth than the other compartment 12 or 14. It should be apparent that diverse configurations, simple or complex, can be planned and implemented for the shells 52 and 54 and the resulting composite bag 10.

The vacuum mold 56 is made of materials capable of withstanding negative pressures that the vacuum molding process creates. Candidate materials include aluminum, epoxy, steel, brass, and alloys of these materials. The cavity sections and subregions are formed using conventional machining and mold making techniques.

(2) Forming the Composite Bag

It is essential that the desired three-dimensional shape of the vacuum-formed shells 52 and 54 be retained during their subsequent assembly into the composite bag 10. Another aspect of the invention prescribes a special heat sealing process that meets this objective. FIGS. 9 to 17 show the details of this process, by which the first and second shells 52 and 54 are assembled into a composite bag 10.

Figure 8:
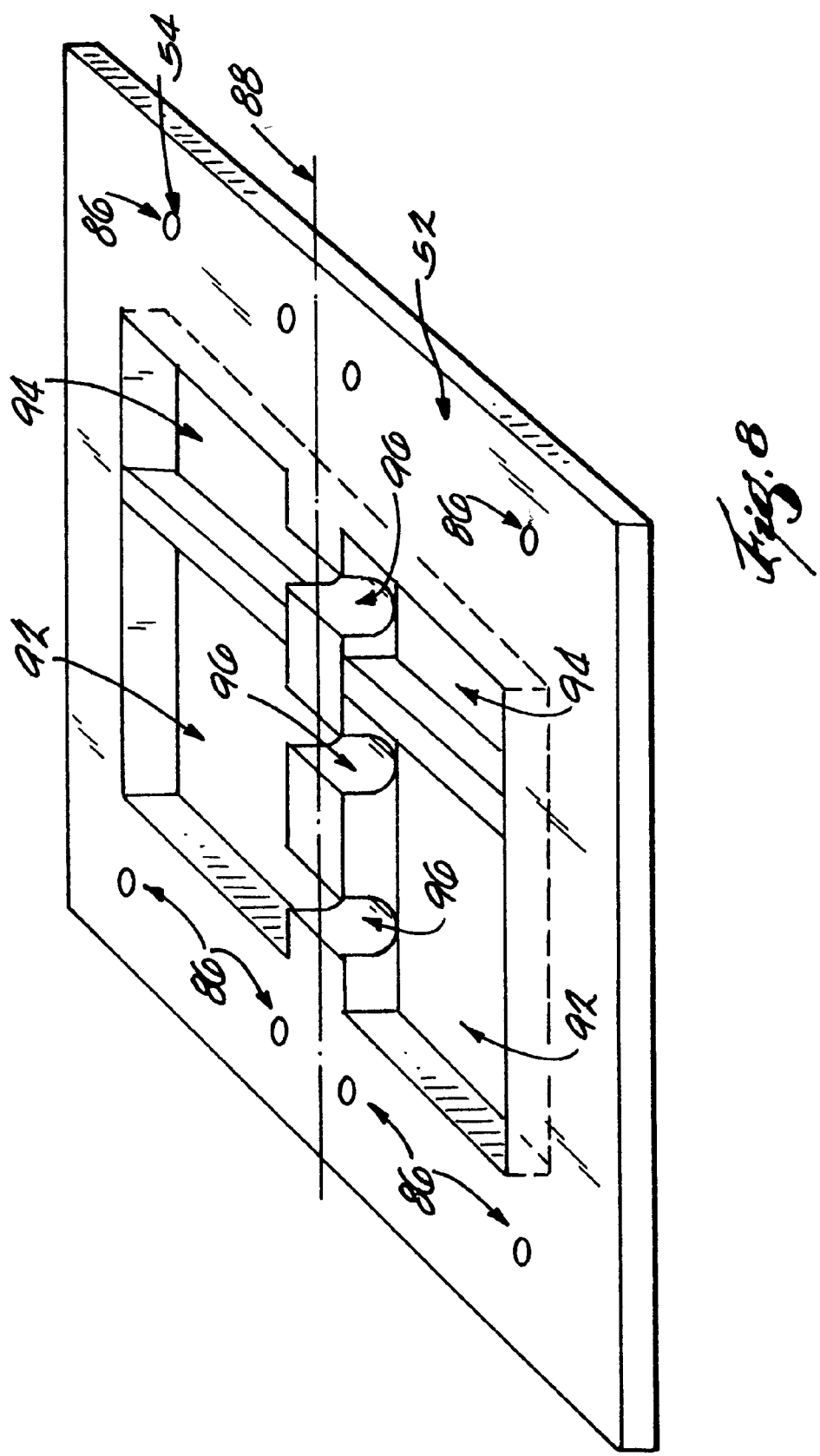
FIG. 8 is a perspective view of the integrated dual shell unit formed by the assembly shown in FIG. 7, which, when cut about its midportion, provides the two shells shown in FIG. 5.

After the vacuum molding process just described, the sheet 80 is cut along the centerline 88 (see FIG. 8). This separates the first and second shells 52 and 54 and creates the top edge 90, as FIG. 5 shows. The heat sealing process (shown sequentially in FIGS. 9 to 12) includes a first sequence, which creates along the top edge 90 the upper seal region 30 of the composite bag 10.

Figure 9:
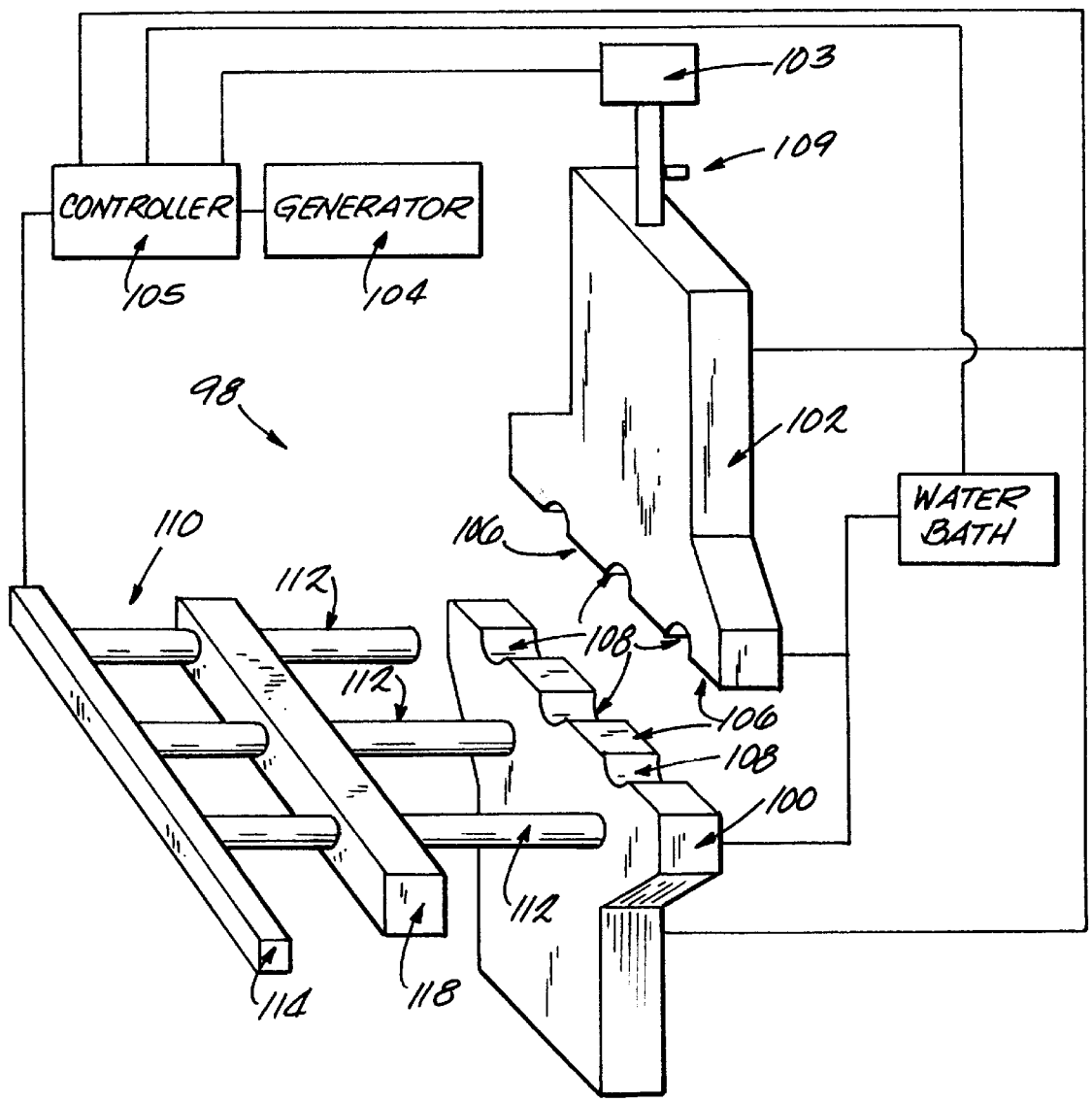
FIG. 9 is a perspective view of the port sealing assembly used to form, by heat sealing, an upper seal region, with associated ports, which is part of the process of making the container shown in FIG. 1 from the shells shown in FIG. 5.

The first step makes use of a sealing assembly 98, a preferred embodiment of which is shown in FIG. 9. The sealing assembly 98 includes mating first and second sealing fixtures 100 and 102. The fixtures 100 and 102 are mutually coupled to a radio frequency (RF) energy generator 104. In the preferred embodiment, the generator 104 comprises a CALLANAN™ Model 20. This model generator is capable of supplying a maximum RF power output of 2000 watts.

Each fixture 100 and 102 includes a planar surface 106 with spaced-apart recesses 108. The spacing between the recesses 108 matches the spacing between the grooves 78(1), 78(2), and 78(3) on the forming fixture 60 (see FIG. 6).

Each recess 108 extends through an arc of 180°. When the fixtures 100 and 102 are mated (see FIG. 12), the recesses 108 coincide to form 360° cylindrical passages.

The fixtures 100 and 102 are made of materials capable of transmitting radio frequency energy. Brass is a preferred material. Aluminum is another candidate material. The material for the fixtures 100 and 102 can be coated. For example, the material can comprise anodized aluminum, or have a release agent coating, such as TEFLON™ plastic.

The surface contours of the fixtures 100 and 102 are formed using conventional machining and mold making techniques.

In the illustrated and preferred embodiment, the sealing assembly 98 also includes a port support tool 110. The tool 110 comprises an array of spaced-apart mandrels 112 supported on an end bar 114. The mandrels 112 are spaced apart at the same intervals as the recesses 108 on the fixtures 100 and 102. The mandrels 112 therefore can be moved as a unit and each caused to nest within a recess 108 (as FIG. 10 shows).

The mandrels 112 are, like the fixtures 100 and 102, made of materials capable of transmitting radio frequency energy, as previously described. Also like the fixtures 100 and 102, the mandrels 112 are coupled to the radio frequency energy generator 104.

Figure 10:
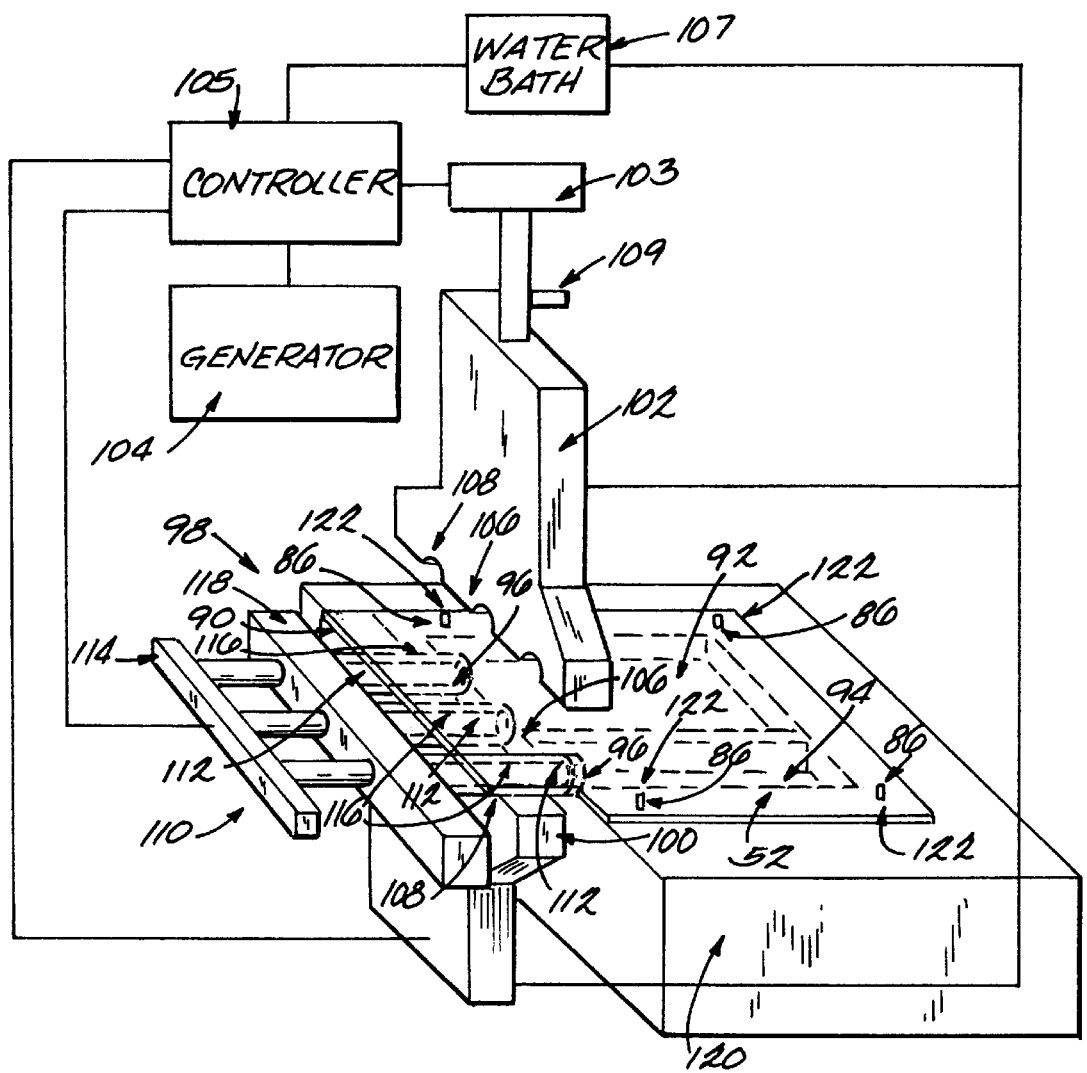
FIGS. 10 to 12 show the steps of using the assembly shown in FIG. 9 to form a subassembly, which joins the two shells shown in FIG. 5 together, with associated ports, along an upper seal region.

As FIG. 10 shows, the mandrels 112 each receives a port tube 116, which forms the core of the respective bag port (see FIG. 4). The port tubes 116 are made of a plastic material, at least the outer surface of which is compatible with the material of the shells 52 and 54 to permit heat sealing. The port tubes 116 abut against a stop bar 118 on the port support tool 110 when they are properly fitted on the mandrels 112.

In the illustrated and preferred embodiment, the sealing assembly 98 includes a controller 105 for the generator 104. The controller 105 conditions the generator 104 to operate in different prescribed modes or duty cycles, thereby allowing precise control over a multiple step sealing process. The controller 105 establishes and maintains one or more of the following process variables: switching the RF polarities of the fixtures 100 and 102 and the mandrels 112; switching the RF power levels from 0% to 100% in predefined incremental steps (for example, in 10% increments); switching the RF tuning controls from zero turns to a preset maximum (for example, 20 turns); or controlling the duration of the duty cycle.

Referring to FIG. 10, with the fixtures 100 and 102 separated, the top edge 90 of the first shell 52 is laid across the first fixture 100, with the shell's convex side facing down toward the fixture 100. The convex side of the regions 96 on the first shell 52 fit inside the concave recesses of the fixture 100. The remainder of the first shell 52 extends beyond the fixture 100 in a direction opposite to the support tool 110. There, the convex side of the shell 52 rests on a support surface 120, free of the port sealing assembly 98.

The surface 120 preferably carries a pattern of locator pins 122. The pattern of locator pins 122 matches the pattern of locator pins 82 on the forming fixture 60 (see FIG. 6). The pattern of holes 86 formed by the pins 82 on the shell 52 thereby coincide with the pattern of locator pins 122 on the surface 120. The pins 122 hold the shell 52 in proper orientation with respect to the fixture 100.

The concave surface of the regions 96 on the shell 52 face up, away from the fixture surface 106. The port tubes 116, carried by the mandrels 112, are placed into the regions 96 of the shell 52. A portion of the port tubes 116 rests within the regions 96, while the remainder of the port tubes 116 extends beyond the edge 90 outside the regions 96.

Figure 11:
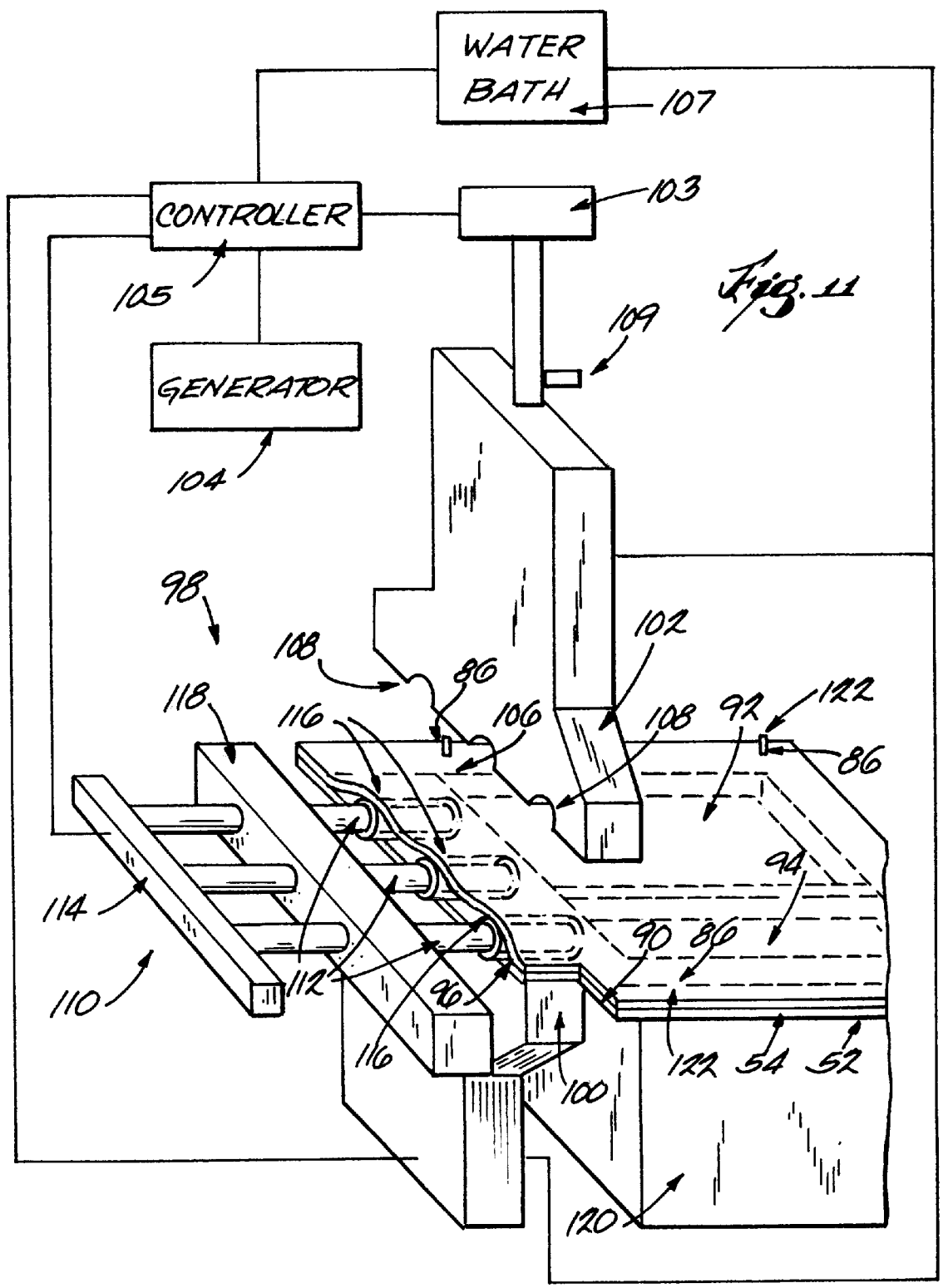

As FIG. 11 shows, the second shell 54 is overlaid, concave surface down, on the first shell 52. The pattern of holes 86 on the second shell 54 fits the pattern of locator pins 122 on the surface 120. The top edge 90 of the second shell 54 aligns on the fixture 100 over the top edge 90 of the first shell 52. The concave surfaces of the regions 96 on the second shell 54 likewise fit over the mandrel-supported port tubes 116. A portion of the port tubes 116 is now fully enclosed within the regions 96 of the shells 52 and 54, while another portion extends beyond the edge 90.

Figure 12:
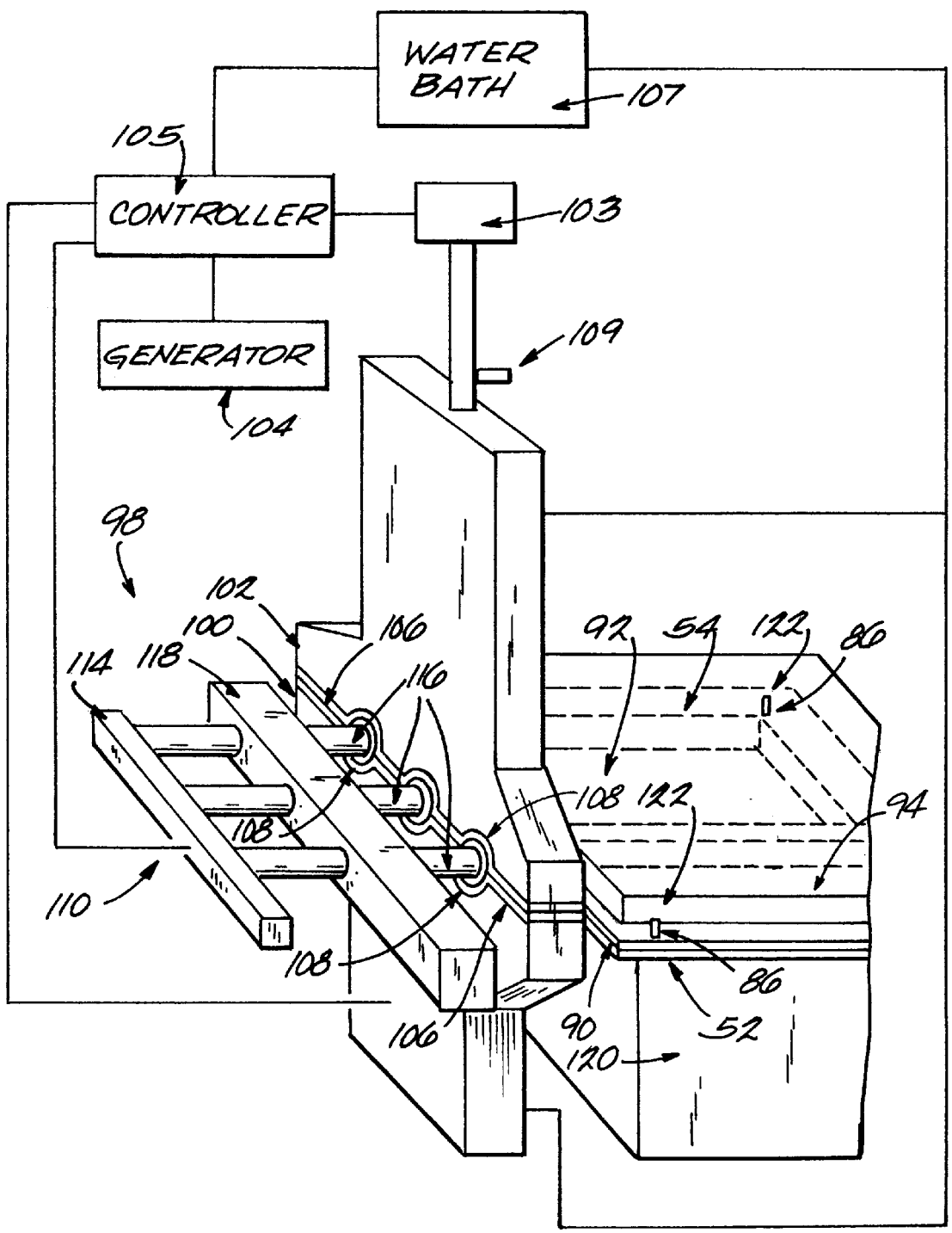

As FIG. 12 shows, the fixture 102 is mated with the fixture 100. In the preferred embodiment, the fixture 102 is coupled to a pneumatic actuator 103, which lowers the fixture 102 under pneumatic pressure onto the fixture 100.

When the fixtures 100 and 102 mate, the recesses 108 coincide to capture the mandrel-supported port tubes 116. The now-facing surfaces 106 of the fixtures 100 and 102 sandwich the top edges 90 of the shells 52 and 54 between them. The now-formed cylindrical recesses 108 likewise sandwich the regions 96 and port tubes 116 between them.

With the assembly 98 and shells 52/54 held in this condition, the controller 105 initiates the first duty cycle of the port sealing process. Under the command of the controller 105, the fixtures 100 and 102 are first heated by a circulating water bath 107 for a preset time interval. The water bath warms the plastic along the top edge 90, the regions 96, and the port tubes 116, while the mating fixtures 100 and 102 apply pressure. The plastic along the top edge 90, the regions 96, and the port tubes 116 softens, thereby increasing the plastic's response to the electric heating effects of RF energy. At a time interval set for about 1.5 seconds, a water bath temperature suitable for accomplishing this objective for most plastics is 100° F.

The controller 105 next establishes RF polarities to supply radio frequency energy to the mandrels 112 for return through the fixtures 100 and 102, which is electrically coupled to RF ground. The controller 105 sets a medium power level, which in the illustrated and preferred embodiment is about 600 watts (about 30% of maximum power). The controller also sets a high RF tuning, which in the illustrated and preferred embodiment is 18 turns of a maximum 20 turns.

The radio frequency energy electrically heats the materials of the port tubes 116 and adjoining shells 52/54 surrounding the port tubes 116. The materials in this heated zone soften and flow together, joining the port tubes 116 to the shells 52/54. The mandrels 112 keep the port tubes 116 open and in a round configuration during the process.

The controller 105 commands the transmission of RF energy from the mandrels 112 through the fixtures 100 and 102 under these conditions for a preset duty cycle. In the illustrated and preferred embodiment, this duty cycle is 2.2 seconds. The controller 105 then terminates the transmission of RF energy for a preset time interval. This allows the heated plastic to cool and set under the pressure exerted by the fixtures 100 and 102. In the illustrated and preferred embodiment, the cooling time interval is set at 1.5 seconds.

The controller 105 next sets new RF polarities. The controller 105 electrically isolates the mandrels 112 from the generator RF. The controller 105 commands RF energy flow to the top fixture 102 for return through the lower fixture 100, which is electrically connected to RF ground. The controller 105 sets a higher power level than in the previous step, which in the illustrated and preferred embodiment is about 1800 watts (about 90% of maximum power). The controller 105 also sets a middle RF tuning, which in the illustrated and preferred embodiment is 12 turns of a maximum 20 turns.

The controller 105 commands the transmission of RF energy through the fixtures 100 and 102 under these conditions for a preset second duty cycle, which is longer than the first duty cycle. In the illustrated and preferred embodiment, this duty cycle is 3.5 seconds.

During this duty cycle, the high power radio frequency energy electrically heats the materials of the shells 52/54 sandwiched between the fixtures 100 and 102. The materials in this heated zone soften and flow together.

The continuous pressure applied by the actuator 103 during the second duty cycle causes the fixtures 100 and 102 to move closer together as the plastic between the fixtures 100 and 102 flows together. The gap between the fixtures 100 and 102 diminishes to squeeze the molten plastic. As the top edges 90 of the shells 52/54 flow together under pressure, the ever-diminishing gap displaces the molten plastic, forming a bead 31 (see FIG. 13) about the periphery of the fixtures surfaces 106.

The actuator 103 for the fixture 102 includes a mechanical or electrical stop 109. The stop 109 prevents further travel of the fixture 102 toward the fixture 100 when a preset minimum gap between the fixture surfaces 106 is reached. In the illustrated and preferred embodiment, the preset minimum gap is about 60% of the combined wall thickness of the shells 52 and 54. The stop 109 assures uniformity of results in terms of seal thickness and strength.

The remainder of the shells 52 and 54, being located away from the fixtures 100 and 102, are not subject to and are unaffected by the electric heating.

At the end of the second duty cycle, the controller 105 interrupts the RF power. A preset period of cooling follows, which in the preferred embodiment is 2.0 seconds. The heated regions of the shells 52/54 and port tubes 116 harden sufficiently so that the fixtures 100 and 102 can be separated. After the cooling period, the controller 105 commands the actuator 103 to withdraw the fixture 102.

The stop bar 118 is advanced to urge the port tubes 116 from the mandrels 112. This frees a partially sealed bag subassembly 124 from the port sealing assembly 98.

Figure 13:
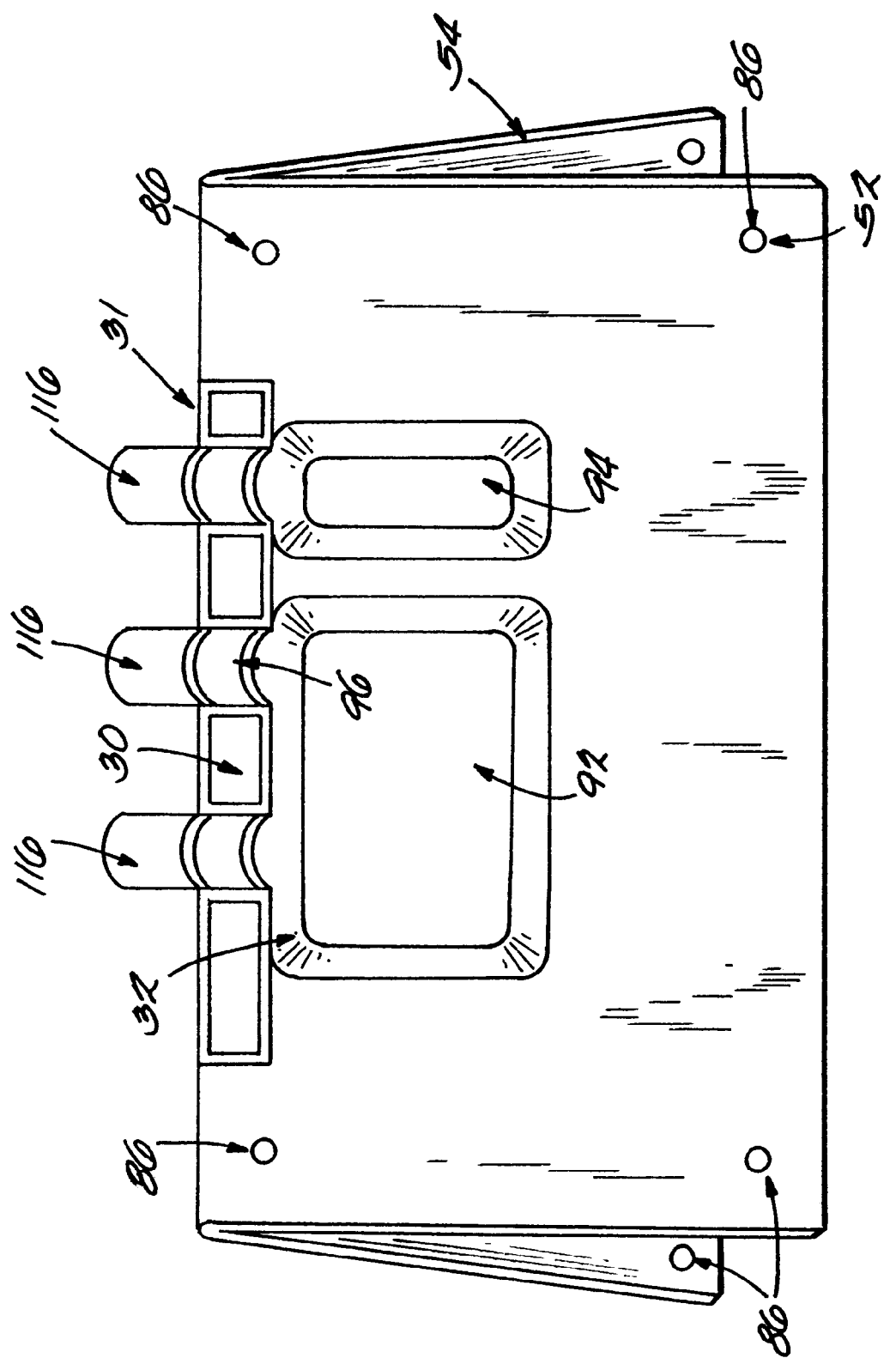
FIG. 13 is a perspective front view of the subassembly formed by the process shown in FIGS. 10 to 12.

As FIG. 13 shows, the electric heating and consequent flow of materials captured by the fixtures 100 and 102 create the upper seal region 30. Here, the flow of materials also joins the exterior of the port tubes 116 between the adjacent materials of the shells 52/54.

As FIG. 13 shows, the partially sealed subassembly 124 comprises the top edges 90 of the shells 52/54 and port tubes 116 joined along the integral seal region 30. The remainder of the shells 52/54 spaced from the seal region 30 in the subassembly 124 are unattached.

The next steps in the sealing process (see FIGS. 14 and 15) make use of a finishing seal assembly 126. The finishing assembly 126 forms the side, bottom, and interior seal regions 34, 36, 40, and 44 of the composite bag 10(see FIG. 1). The finishing assembly 126 also forms the interior passages 24 and 26 of the composite bag 10.

The finishing assembly 126 includes first and second fixtures 128 and 130 (which is also shown in FIGS. 16 and 17). The fixtures 128 and 130 are, in use, adapted to be placed in face-to-face contact (see FIG. 15). As FIGS. 14 and 15 show, the fixtures are mutually coupled to a radio frequency energy generator 132. In the illustrated and preferred embodiment, the generator 132 is a THERMA-TRON™ model having a 3000 watt power level. An associated controller 133 controls duty cycle intervals.

As FIGS. 16 to 19 best show, the fixtures 128 and 130 each includes an open interior cavity 134 peripherally enclosed by side walls 136, a rear wall 138, and a front wall 140. Each wall 136, 138, and 140 respectively terminates in a surface 137, 139, and 141. As FIGS. 18 and 19 best show, portions of the front wall 136 have removed to form openings 142 and 144 into the cavity 134.

The surfaces 137 and 139 are machined to be coplanar with each other. The surfaces 137 and 139 also form a continuous periphery about the cavity 134, with no interruptions.

The surface 141 is also machined to be coplanar with the surfaces 137 and 139, except in the regions of the openings 142 and 144. The surface 141 steps down about the openings 142 and 144 below the plane of the surfaces 137 and 139.

Each fixture 128 and 130 also includes an interior wall 146, which extends through the cavity 134 between the rear wall 138 and the front wall 140. The interior wall 146 terminates in a surface 147. The interior wall 146 divides the cavity 134 into two cavity regions 134A and 134B.

The surface 147 is not continuous, but is interrupted by spaced apart notches 148 and 150. The surface 147 is machined to be coplanar with the surfaces 137 and 139, except where the notches 148 and 150 interrupt the surface 147. The surface 147 outside the notches 148 and 150 is also machined to be coplanar with the surface 141, except where the surface 141 steps down about the openings 142 and 144.

The fixtures are made of materials capable of transmitting radio frequency energy, which have already been described. The various cavity regions are formed using conventional machining and mold making techniques.

As FIGS. 16 and 17 best show, the geometry of the walls 136, 138, 140, and 146 of the first fixture 128 presents a mirror image of the geometry of the corresponding walls 136, 138, 140, and 146 of the second fixture 130. Thus, when the fixtures 128 and 130 are place in face-to-face contact (as FIG. 15 shows), the planar surfaces 137, 139, 141, and 147 overlie each other. Likewise, the openings 142 and 144 and notches 148 and 150 coincide. The first and second cavity regions 134A and 134B also coincide.

The peripheral dimension of the cavity region 134A are purposely made larger than the peripheral dimension of the region 92 formed on the first and second shells 52 and 54. Likewise, the peripheral dimension of the cavity region 134B are purposely made larger than the peripheral dimension of the region 94 formed on the first and second shells 52 and 54. The width of the opening 142 is purposely made larger than the space occupied by the two port tubes 116 aligned during the port sealing process with the region 96. Similarly, the width of the opening 144 is purposely made larger than the space occupied by the port tube 116 aligned during the port sealing process with the region 96. Clearance is thereby provided, and contact thereby prevented, between the fixtures 128 and 130 and all these regions 92, 94, and 96 of the shells 52 and 54. The clearance is sufficient, if a space between these shell regions 92, 94, and 96 and radio frequency transmitting surfaces of the fixtures 128 and 130 can be ascertained by visual inspection.

Furthermore, at any location within the cavity 134, the minimum depth of the cavity 134 (measured from a coplanar surface 137 or 139 to the floor 152 of the cavity 134) exceeds the maximum convex projection of the region 92 or 94 facing the floor 152. Contact between any preformed convex region 94 or 96 of the shells 52 and 54 is thereby avoided. It is preferred that the minimum cavity depth exceeds the maximum convex shell projection by at least 100%. For example, if the maximum convex projection of the region 92 of shell 52 is 0.25 inch, the minimum depth of the cavity region 134A of the fixture 128 or 130 should be 0.5 inch.

As FIG. 14 shows, either shell 52 or 54 of the bag subassembly 124 can be laid on the fixture 128, with the joined top edges 90 positioned along the front surface 141 of the fixture 128. A pneumatic actuator 131 moves the other fixture 130 to bring it into face-to-face contact with the fixture 128. The fixtures 128 and 130 sandwich the bag subassembly between them, subject to the pressure applied by the actuator 131.

In this condition, the exterior of the convex regions 92 and 94 of the shells 52 and 54 nest inside the mating cavity regions, respectively, 134A and 134B, of the fixtures 128 and 130. The exterior of the convex regions 92 and 94 occupying the cavity regions 134A and 134B are spaced away from the mating surfaces 137, 139, 141, and 147. The exterior of the convex regions 92 and 94 also are held out of contact with the floor 152 of the associated cavity region 134A and 134B.

However, the surfaces 137, 139, 141, and 147 contact the planar regions of the shell 52 outside the convex regions 92 and 94, except in the region of the openings 142 and 144 and the notches 148 and 150. The preformed regions 96, the port tubes 116 and adjacent areas of the upper seal region 30 pass through the openings 142 and 144, away from contact with the surface 141. The notches 148 and 150 represent interruption of contact along the surface 147.

With the subassembly 124 and the finishing assembly 126 held in this condition, the controller 131 circulates heater water from a heated water bath 133 through the fixtures 128 and 130 for a preset time interval. As before described in connection with the port sealing process, the water bath 131 warms the plastic in the planar regions of the shells 52 and 54, which are sandwiched between the surfaces 137, 139, 141, and 147, while the mating fixtures 128 and 130 apply pressure. The plastic in these planar regions softens, thereby increasing the plastic's response to the electric heating effects of RF energy. At a time interval set for about 2.0 seconds, a water bath temperature suitable for accomplishing this objective for most plastics is 100° F.

The controller 133 next commands the generator 132 to supply high power radio frequency energy (3000 watts) from the fixture 128 to the fixture 130, which is coupled to RF ground.

The materials of the planar regions of the shells 52 and 54, which are sandwiched between the surfaces 137, 139, 141, and 147, are subject to electric heating effects. These materials soften and flow together.

The continuous pressure applied by the actuator 131 causes the fixtures 128 and 130 to move progressively closer together as the plastic between the fixtures 128 and 130 flows together. The gap between the fixtures 100 and 102 diminishes to squeeze the molten plastic. The ever-diminishing gap displaces the molten plastic, forming a bead 33 (see FIG. 1) about the periphery of the mating fixtures 128 and 130. As before described, a mechanical or electrical stop 109 prevents travel of the fixture 130 toward the fixture 128 when a preset minimum gap between the fixtures is reached. In the illustrated and preferred embodiment, the preset minimum gap is about 60% of the combined wall thickness of the shells 52 and 54.

However, the non-planar, preformed regions 92 and 94, purposely kept away from these surfaces 137, 139, 141, and 147 and the floor 152 of the cavity 134, are not subject to electric heating and softening. Likewise, the preformed port regions 96, the port tubes 116, and adjacent areas of the previously formed upper seal region 30 pass through the openings 142 and 144, and are not subject to further electric heating and softening. Furthermore, the shell material lying against the notches 148 and 150 are not subject to electric heating and softening. The electric heating effect is localized to only those planar regions of the shells 52 and 54 outside the preformed non-planar regions 92, 94, and 96. It is only these localized non-planar regions that are soften and flow together.

After a present duty cycle (which in the preferred embodiment is 3.5 seconds), the controller 133 terminates the supply of RF energy to the fixtures 128 and 130. After a brief period of cooling Which in the preferred embodiment is 3.0 seconds), the fixtures 128 and 130 are separated.

The localized heating and flow of materials along the surface 139 have formed the bottom seal region 40. The localized heating and flow of materials along the surfaces 137 have formed the left side and right side seal regions 34 and 36. The localized heating and flow of materials along the surface 147 outside the notches 148 and 150 have formed the interior seal region 44. The notches 148 and 150 have otherwise interrupted the interior seal region 44 to form the interior passages 24 and 26.

The localized heating and flow of materials along the surface 141 merges the bottom seal region 40, the side seal regions 34 and 36, and the interior seal region 44 with the previous, separately formed upper seal region 30. The peripheral seal 28 is complete.

Excess materials outboard of the peripheral seal bead 33 are trimmed away by cutting or punching. Alternatively, the surfaces 137 and 139 on one of the fixtures 128 or 130 can include a raised edge 154 (shown in phantom lines in FIG. 19). The raised edge 154 creates during electric heating of the material an elongated zone of weakness, along which excess material can be torn away.

In the same fashion, the interior surface 147 and the adjoining parts of surfaces 139 and 141 of one of the fixtures 128 or 130 can include a raised edge 156 (also shown in phantom lines in FIG. 19). The raised edge 156 creates during electric heating of the material an elongated zone of weakness (shown by phantom line 158 in FIG. 1). The weakened zone 158 within the seal region 44 allows the first and second chambers 12 and 14 to be conveniently separated during use.

As FIG. 4 shows, tubes 160, each carrying the previously described pierceable membrane 22 are inserted into the appropriate port tubes 116 and secured there using, for example, adhesive or a solvent. The tubing 17 is likewise secured by adhesive or solvent bonding to the appropriate port tube 116. As FIG. 4 also shows, the cap 25 is also be inserted on each port tube 116. The flexible, three-dimensional composite bag 10 has been created.

The composite bag 10 can be sterilized by conventional methods, without deformation. The manner of sterilization selected depends upon the materials that the bag 10 incorporates. For example, all plastic materials can undergo ethylene oxide (ETO) sterilization. Plastic materials, such as conventional medical grade polyvinylchloride, can also be sterilized by autoclaving. Other plastic materials, like ethylene-vinyl-alcohol, which melt at autoclaving temperatures, can be sterilized by exposure to gamma radiation.

Circumstances may give rise to material compatible issues. For example, material selected for the port tube 116 (for example, polyvinyl chloride) to allow adhesive or solvent sealing of the membrane tube 160 or the tubing 17 may not itself be heat sealable to the bag material (for example, if the bag 10 is made from ethylene-vinyl-alcohol). In such circumstances, the port tube 116 preferably comprises a coextrusion of two layers 162 and 164 of different materials, as FIG. 20 shows. In the arrangement, the first material for the exterior layer 162 of the port tube 116 is selected to be heat sealable to the material of the bag 10 during the port sealing process described above. The second material for the interior layer 164 of the port tube 116 is selected to be solvent bonded to the material of the membrane tube 160 during final assembly of the bag 10, also as previously described. In the context of the example given above, the coextrusion for the port tube 116 comprises an outer layer 162 of ethylene-vinyl-alcohol material and an inner layer 164 of polyvinyl chloride.

As before generally discussed, the geometry for the bag can vary, according to the requirements imposed by the intended use. For example, access by a conventional hand-held sealer (made, for example, by Sebra) to seal the interior passages 24 and 26 is made more difficult as the distance between the passages 24 and 26 and the adjacent peripheral edges of the bag 10 increases. A preferred way of improving the bag 10 is to locate the interior passages 24 and 26 as close to the adjacent bag edges as possible.

Figure 21:
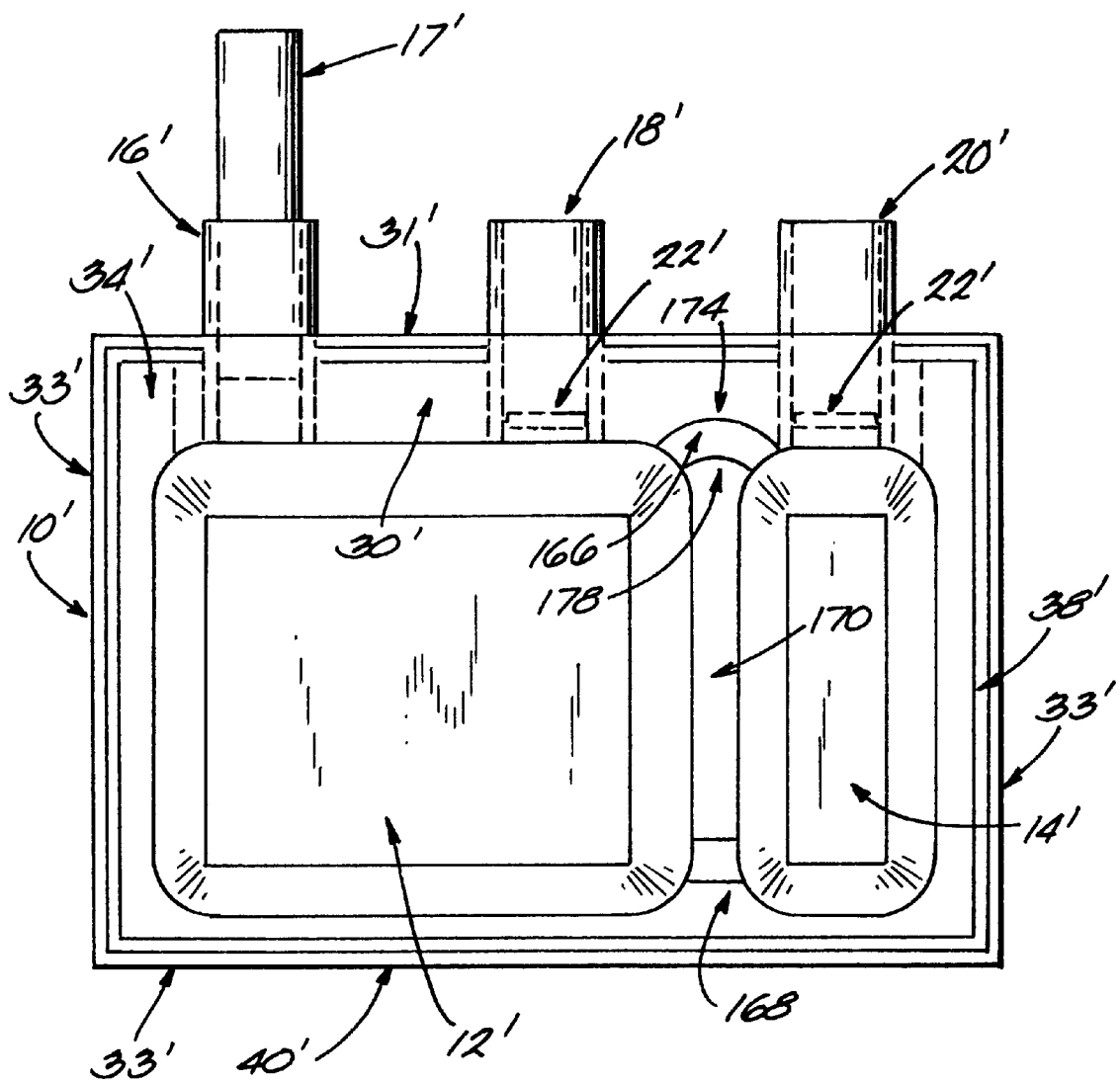
FIG. 21 is an alternative embodiment of a flexible, three-dimensional container, which also embodies features of the invention.

Furthermore, the proximity of the hand-held sealer to the vacuum formed surfaces of the compartments 12 and 14 may cause unintentional RF heating effects. Just as it is important to shield these preformed regions of the shells 52 and 54 from electric heating effects during assembly of the bag 10, it is equally important to shield these preformed regions electric heating effects during use of the bag 10. A preferred way of improving the bag 10 is to provide increased lateral spacing between the two chambers 12 and 14, to better accommodate a hand-held sealer without unintended electric heating effects FIG. 21 shows another preferred embodiment for a composite bag 10', which embodies features of the invention and which incorporates the above-identified improvements. The bag 10' includes most of the same structural features already described in connection with the bag 10 shown in FIGS. 1 to 3. Common reference numerals are therefore assigned, except, in FIG. 21, these reference numerals include a trailing apostrophe (').

Like the first described composite bag 10, the composite bag 10' in FIG. 21 comprises two interior compartments 12' and 14' surrounded by peripheral seal 28'. The compartments 12' and 14' are serviced by multiple ports 16', 18', and 20'. Port 16' has preattached flexible tubing 17'. Ports 18' and 20' carry within them pierceable membranes 22'.

Like the composite bag 10 shown in FIG. 1, the composite bag 10' includes upper and lower interior passages 166 and 168, which permit flow communication between the interior compartments 12' and 14'. However, the geometry and placement of the upper and lower interior passages 166 and 168 differ from the passages 24 and 26 shown in FIG. 1.

More particularly, in FIG. 21, the upper interior passage 166 extends in an arcuate path into the upper seal region 30' of the bag 10'. This arcuate path positions the passage 166 very closely to the top edge 90' of the bag 10'. Likewise, in FIG. 21, the lower interior passage 168, while not extending in an arcuate path, is nevertheless moved closer to the bottom edge of the bag 10' than the passage 26 in the bag 10. This altered positioning for the passages 166 and 168 make the passages 166 and 168 more easily accessed for sealing using a conventional hand-held RF sealer, than the passages 24 and 26, as positioned in FIG. 1.

In addition, the bag 10' includes an interior seal 170 having an increase width, compared to the interior seal 44 shown in FIG. 1. The increase width of the interior seal 170 increases the spacing between the first and second compartments 12' and 14'. The increased width of the interior seal 170 thereby further distances the preformed compartments regions away from unintended electric heat effects during use, caused by proximity to hand-held heat sealing tools.

The increased width dimension of the seal 170 depends upon the dimensions and geometry of the sealing tool used. For example, a Model 1090 SEBRA™ tool (described above) uses a cylindrical heating electrode that is about ⅜ inch in diameter. It has been determined that this heating electrode will cause unintended heating effects in the material of the compartments 12 and 14 when the interior seal 44 is about ⅛ inch in width. However, when the interior seal 170 having an increased width of ¼ inch is present, these unintended heating effects are eliminated.

These variations in geometry in the bag 10' shown in FIG. 21 are accomplished during the vacuum molding process and the heat sealing process.

The increased lateral spacing between the two chambers 12' and 14' is accomplished by increasing the width of the interior partition 76 in the vacuum forming fixture 60. The surface 147 of the heat sealing fixtures 128 and 130 is also correspondingly increased in width. Together, these two alterations increase the width of the zone along the surface 147 in which the shell material can be electrically heated, without also electrically heating the preformed regions 92 and 94 that ultimately define the compartments 12' and 14'. An interior seal 170 of increased width can thereby be created.

The formation of the arcuate passage 166 is accomplished by altering the geometries of the port sealing fixtures 100 and 102 and the finishing fixtures 128 and 130.

Figure 22:
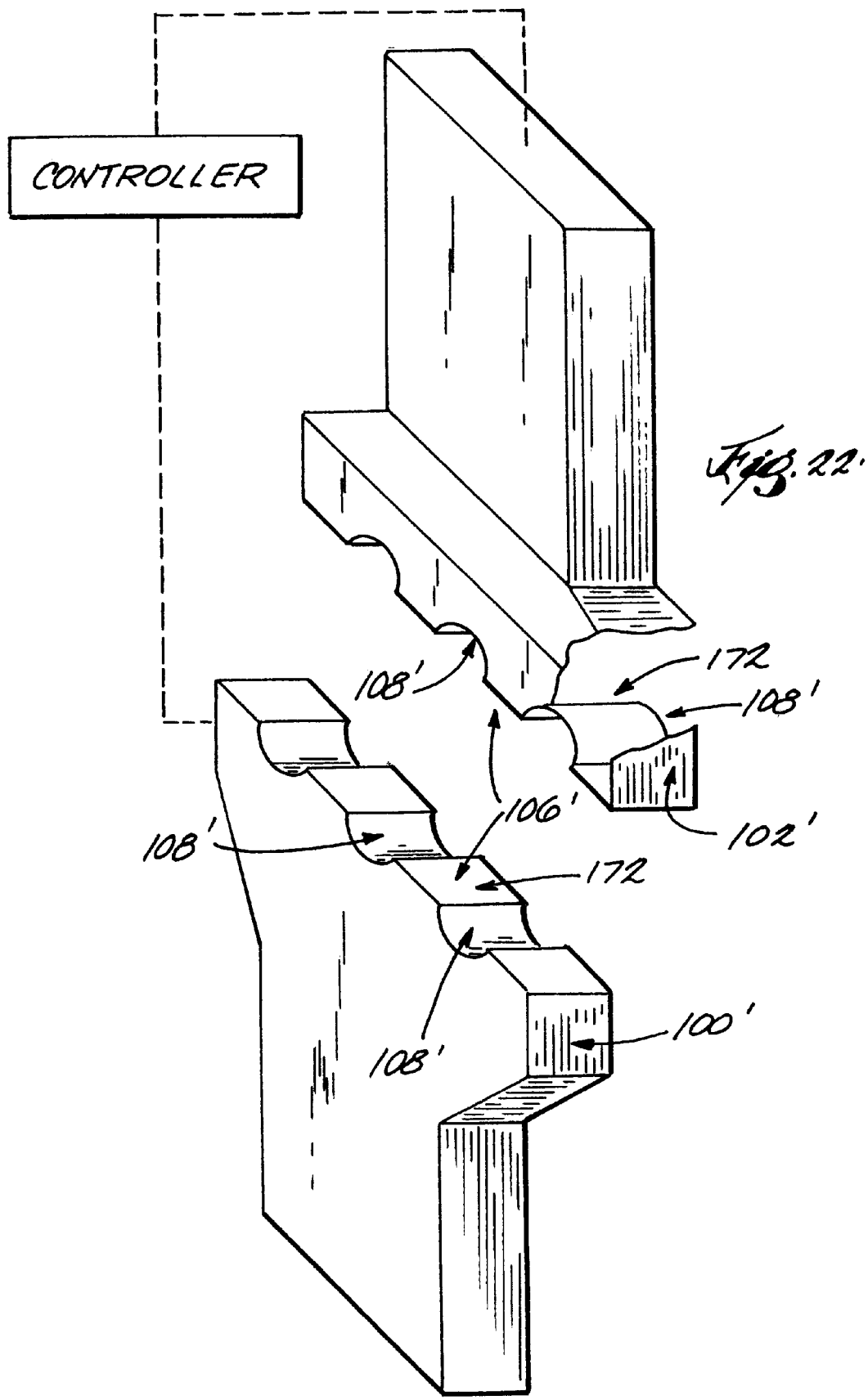
FIG. 22 is a perspective view of a port sealing assembly used to form by heat sealing an upper seal region, with associated ports, which is part of the process of making the alternative container shown in FIG. 21 from the shells shown in FIG. 5.

As shown in FIG. 22, the modified port sealing fixtures (designated 100' and 102') include mating arcuate notches 172 formed to define the desire contour for the top periphery 174 of the passage 166 (see FIG. 21).

The notches 172 are located on the surface 106' of the fixtures 100' and 102' between the recesses 108' in which the port 18' of the first compartment 12' and the port 20' of the second compartment 14' are formed during the port sealing process. The notches 172 coincide when the fixtures 100' and 102' are brought together. In all other respects, the port sealing process using the fixtures 100' and 102' is the same as previously described using the fixtures 100 and 102.

Figure 23:
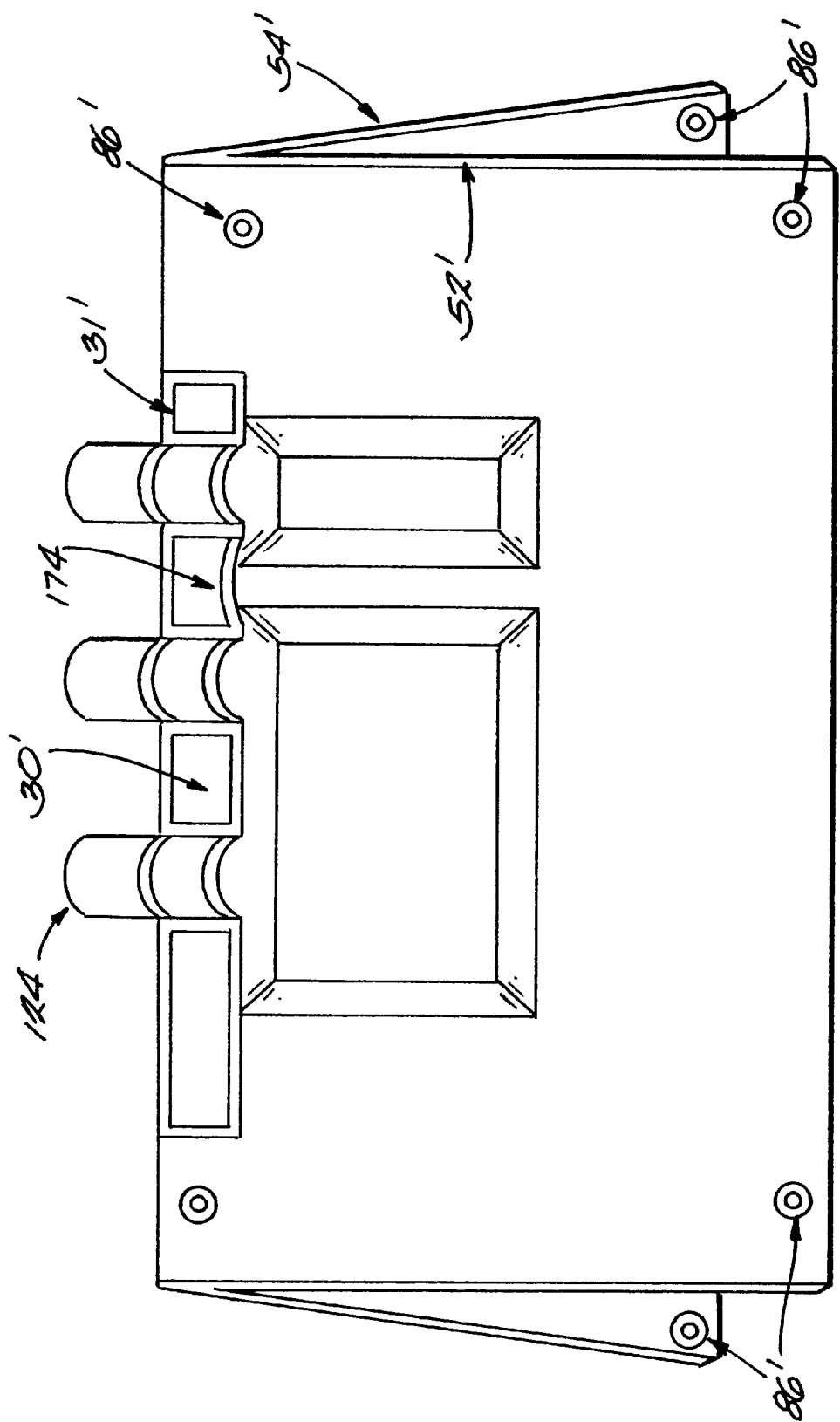
FIG. 23 is a perspective front view of a subassembly formed when the upper seal region is made using the assembly shown in FIG. 22 in the process of making the alternative container shown in FIG. 21.

As FIG. 23 shows, the subassembly 124' formed during the port sealing operation using the modified fixtures 100' and 102' includes in the upper seal region 30' the desired top periphery 174 of the passage 166, which is formed by the mating notches 172. The upper seal region 30' formed is otherwise the same as previously described, and the shells 52' and 54' are otherwise unattached outside the formed upper seal region 30', as also described before.

Figure 24:
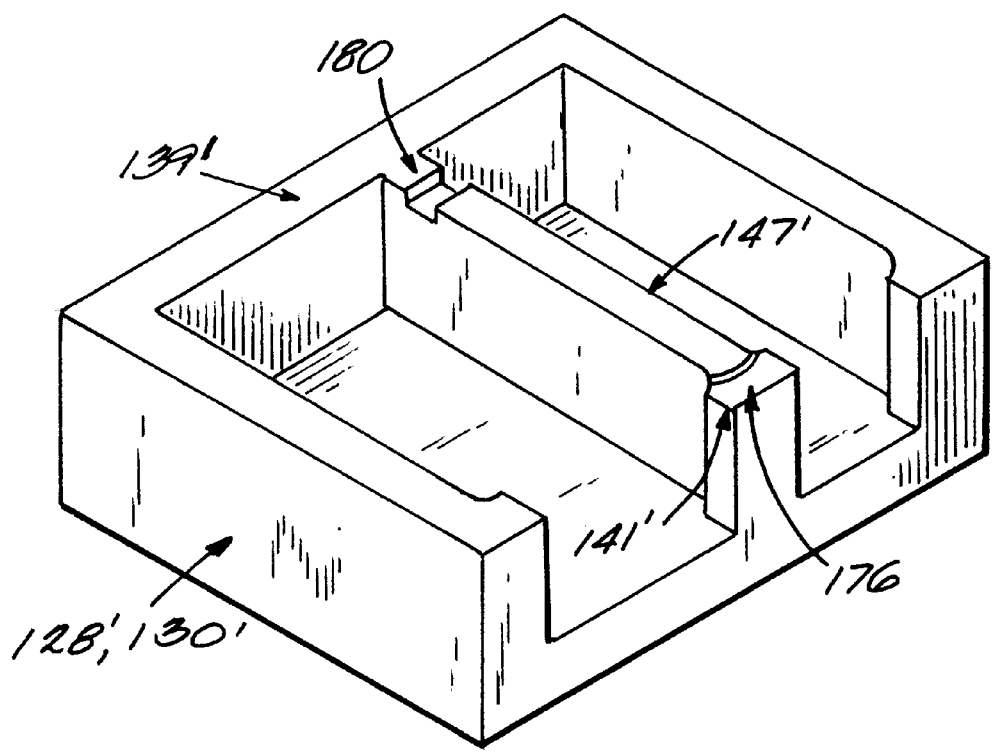
FIG. 24 is a top perspective view of a finishing assembly used to form by heat sealing additional peripheral and interior seals, which is part of the process of making the container shown in FIG. 21 from the subassembly shown in FIG. 23.

As shown in FIG. 24, the modified finishing fixtures 128' and 130' include an arcuate edge 176 on the surface 147' at the intersection of the surface 147' with the front surface 141'. Electric heating along this edge 176 during the finishing heat sealing process forms the bottom arcuate periphery 178 of the passage 166, shown in FIG. 21.

The modified finishing fixtures 128' and 130' also include a notch 180 formed in the surface 147'. The notch 180 in the surface 147' is formed closer to the bottom surface 139' than the notch 150 shown in FIGS. 16 to 19. Electric heating about the notch 180 during the finishing heat sealing process will thereby form the passage 168 closer to the bottom seal region 40' than that shown in FIGS. 1 to 3. In all other respects, the finishing heat sealing process using the fixtures 128' and 130' is the same as that described using the fixtures 128 and 130.

The bag 10 or 10', when empty, possesses a precise, predefined three-dimensional geometry. The three-dimensional geometry can be simple or complex. The geometry can, for example, provide interior compartmentalization, multiple interior flow passages, and diverse geometries (either curvilinear, or rectilinear, or both) with diverse dimensions (large or small).

During use, the composite bag 10 or 10' maintains its intended predefined three-dimensional geometry, without localized deformation or stress-related material fatigue or failure. The prescribed multiple step manufacturing processes described above provide this precise, stable geometry of the composite bag 10 or 10'. The prescribed manufacturing processes provide a composite bag 10 or 10' that meets exacting size and volume requirements, both before and during use, as dictated by the intended use. The vacuum molding process, augmented by the heat sealing process, as described, combine to create a robust container structure more resistant to stress-related material fatigue or failure than conventional bags made from opposing flat sheets of plastic material. This attribute makes the bag 10 or 10' particularly well suited for use in the medical field, where standards against failure and leakage are high. The precise geometry of the flexible, three-dimensional structure made using the vacuum molding process, augmented by the heat sealing process, as described, is also well suited for use in accurately measuring fluid volumes.

Figure 25:
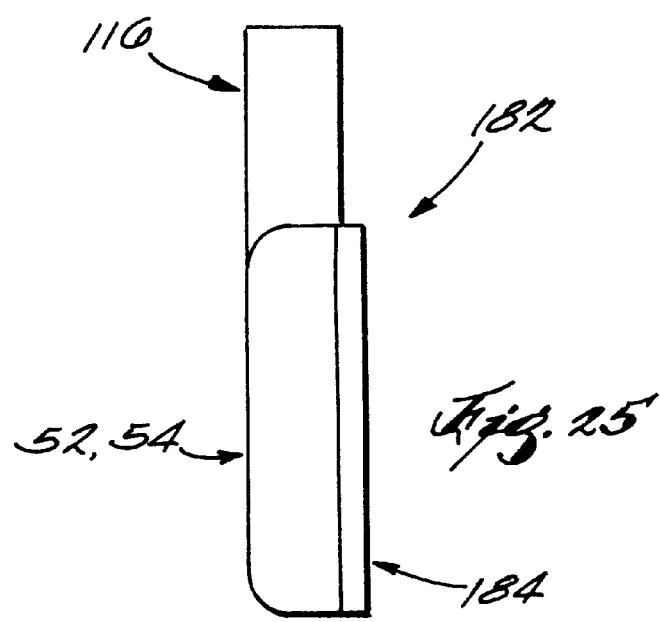
FIG. 25 is a side elevation view of an alternative embodiment of a flexible, three-dimensional container, which embodies features of the invention.

It should be appreciated that variations to the described structures and processes can be made while keeping many of the important features of the invention. For example, as FIG. 25 shows, a container 182 can be formed by heat sealing one or more port tubes 116 to a flat sheet 184 of flexible plastic material and a vacuum molded single shell 52 or 54. As another example, instead of vacuum molding both shells 52 and 54 using a single fixture 60, as shown in FIG. 6, the shells 52 and 54 can be individually molded using separate, mirror-image vacuum molding fixtures.

The features of the invention are set forth in the following claims.

We claim:

1. A flexible, three-dimensional blood constituent container comprising
   a first wall of flexible sheet material suitable for cryogenic storage of the blood constituent the wall having a planar area extending in a plane and a cavity area drawn out of the plane into a predefined three-dimensional geometry by vacuum molding,
   a second wall overlying the first wall to close the cavity area and thereby form an interior compartment,
   a seal formed by heating the second wall and the first wall in the planar area and not in the cavity area of the first wall and a port extending in the seal and providing fluid flow communicating with the interior compartment.

2. A flexible, three-dimensional container comprising
   a first wall of flexible sheet material having a peripheral planar area extending in a plane, first and second cavity areas each drawn out of the plane into a predefined three-dimensional geometry by vacuum molding, and an interior planar area extending in the plane between the first and second cavity areas,
   a second wall overlying the first wall to close the first and second cavity area and thereby form first and second interior compartments,
   a seal formed by heating the second wall and the first wall in the peripheral and interior planar areas and not in the first and second cavity areas of the first wall,
   a port extending in the seal and providing fluid flow communicating with one of the first and second interior compartments, and
   an interruption in the seal in the interior planar area forming an interior passage between the first and second interior compartments.

3. A flexible, three-dimensional blood constituent container comprising
   overlying first and second walls of flexible sheet material suitable for cryogenic storage of the blood constituent, each wall having a planar area extending in a plane and a cavity area drawn out of the plane into a predefined three-dimensional geometry by vacuum molding, the first wall comprising a mirror image of the second wall so that the overlying first and second walls comprise coincident planar areas and coincident cavity areas together defining an interior compartment,
   a seal formed by heating the overlying first and second walls in the coincident planar areas and not in the coincident cavity areas, and
   a port extending in the seal and providing fluid flow communicating with the interior compartment.

4. A flexible, three-dimensional container comprising
   overlying first and second walls of flexible sheet material each having a peripheral planar area extending in a plane, first and second cavity areas drawn out of the plane into predefined three-dimensional geometries by vacuum molding, and an interior planar area extending in the plane between the first and second cavity areas, the first wall comprising a mirror image of the second wall so that the overlying first and second walls comprise coincident peripheral planar areas, coincident interior planar areas, and coincident first and second cavity areas together defining, respectively, first and second interior compartments,
   a seal formed by heating the overlying first and second walls in the coincident peripheral and interior planar areas and not in the coincident first and second cavity areas,
   an interruption in the seal in the coincident interior planar areas forming an interior passage between the first and second interior compartments, and
   a port extending in the seal and providing fluid flow communicating with one of the first and second interior compartments.

5. A container according to claim 4 and further including first and second ports extending in the seal and providing fluid flow communicating with, respectively, the first and second interior compartments.

6. A container comprising a first wall having a peripheral surface, vacuum-formed areas creating first and second cavities, and an interior surface between the first and second cavities, a second wall overlying the first wall and closing the first and second cavities to form first and second interior compartments, a seal between the second wall and the peripheral and interior surfaces of the first wall, and an interruption in the seal forming a passage that provides fluid flow communication between the first and second compartments, at least a portion of the passage being formed between the second wall and the peripheral surface of the first wall.

7. A container according to claim 6 wherein another portion of the passage is formed between the second wall and the interior surface of the first wall.

8. A container according to claim 6 wherein the passage includes peripheral edges, and at least one of the peripheral edges follows an arc.

9. A container according to claim 6 and further including a second interruption in the seal forming a second passage that provides fluid flow communication between the first and second compartments.

10. A container according to claim 9 wherein the second passage is formed between the second wall and the interior surface of the first wall.

11. A method for making a three-dimensional blood constituent container comprising the steps of vacuum-molding a first wall from a sheet of flexible material suitable for cryogenic storage of the blood constituent the wall to include a planar area extending in a plane and a cavity area drawn out of the plane into a predefined three-dimensional geometry, overlying a second wall upon the first wall to close the cavity area and thereby form an interior compartment, forming a thermal seal to join the first and second walls by heating the second wall and the first wall in the planar area and not in the cavity area of the first wall, and forming a port that extends in the seal to provide fluid flow communicating with the interior compartment.

12. A method for making a three-dimensional container comprising vacuum-molding a first wall from a sheet of flexible material to include a peripheral planar area extending in a plane, first and second cavity areas each drawn out of the plane into a predefined three-dimensional geometry, and an interior planar area extending in the plane between the first and second cavity areas, overlying a second wall upon the first wall to close the first and second cavity areas and thereby form first and second interior compartments, forming a thermal seal to join the first and second walls by heating the second wall and the first wall in the peripheral and interior planar areas and not in the first and second cavity areas of the first wall, forming a port in the seal to provide fluid flow communicating with one of the first and second interior compartments, and interrupting the seal in the interior planar area to form an interior passage between the first and second interior compartments.

13. A method according to claim 12 and further including the step of forming first and second ports in the seal to provide fluid flow communicating with, respectively, the first and second interior compartments.

14. A method for making a three-dimensional blood constituent container comprising the steps of vacuum-molding first and second walls from at least one sheet of flexible material suitable for cryogenic storage of the blood constituent the wall to each include a planar area extending in a plane and a cavity area drawn out of the plane into a predefined three-dimensional geometry, the first wall comprising a mirror image of the second wall, overlying the first and second walls to form coincident planar areas and coincident cavity areas together defining an interior compartment, forming a thermal seal to join the first and second walls be heating the overlying first and second walls in the coincident planar areas and not in the coincident cavity areas, and forming a port extending in the seal to provide fluid flow communicating with the interior compartment.

15. A method for making a three-dimensional container comprising vacuum-molding first and second walls from at least one sheet of flexible material to each include a planar area extending in a plane, first and second cavity areas drawn out of the plane into a predefined three-dimensional geometries, and an interior planar area extending in the plane between the first and second cavity areas, the first wall comprising a mirror image of the second wall, overlying the first and second walls to form coincident peripheral planar areas, coincident interior planar areas, and coincident first and second cavity areas together defining, respectively, first and second interior compartments, forming a thermal seal to join the first and second walls by heating the overlying first and second walls in the coincident peripheral and interior planar areas and not in the coincident first and second cavity areas, interrupting the seal in the coincident interior planar areas to form an interior passage between the first and second interior compartments, and forming a port in the seal to provide fluid flow communicating with one of the first and second interior compartments.

16. A method according to claim 15 and further including the step of forming first and second ports in the seal to provide fluid flow communicating with, respectively, the first and second interior compartments.

* * * * *

UNITED STATES PATENT AND TRADEMARK OFFICE
CERTIFICATE OF CORRECTION

PATENT NO.   : 6,213,334 B1                                               Page 1 of 1
DATED        : April 10, 2001
INVENTOR(S)  : Philip H. Coelho, Ludwig Wolf, Jr., David P. Fisher, Allen R. Wons, William Bratten It is certified that error appears in the above-identified patent and that said Letters Patent is hereby corrected as shown below:

<u>Title page,</u>
Item [73], after "Assignee: Baxter International INC" insert -- (assignee of Ludwig Wolf, Jr.; David P. Fischer; Allen R. Wons; William Bratten) --

Signed and Sealed this

Eighth Day of January, 2002

*Attest:*

JAMES E. ROGAN
*Attesting Officer*          *Director of the United States Patent and Trademark Office*